US012659788B2

(12) United States Patent
Pan

(10) Patent No.: US 12,659,788 B2
(45) Date of Patent: Jun. 16, 2026

(54) METHOD AND APPARATUS FOR SUPPORTING UE-TO-NETWORK RELAY COMMUNICATION IN A WIRELESS COMMUNICATION SYSTEM

(71) Applicant: ASUSTek Computer Inc., Taipei City (TW)

(72) Inventor: Li-Te Pan, Taipei City (TW)

(73) Assignee: ASUSTek Computer Inc., Taipei City (TW)

( * ) Notice: Subject to any disclaimer, the term of this patent is extended or adjusted under 35 U.S.C. 154(b) by 429 days.

(21) Appl. No.: 17/749,785

(22) Filed: May 20, 2022

(65) Prior Publication Data

US 2022/0377598 A1    Nov. 24, 2022

Related U.S. Application Data

(60) Provisional application No. 63/191,035, filed on May 20, 2021.

(51) Int. Cl.
| *H04W 28/02* | (2009.01) |
| *H04W 76/14* | (2018.01) |
| *H04W 92/18* | (2009.01) |

(52) U.S. Cl.
CPC ... *H04W 28/0268* (2013.01); *H04W 28/0273* (2013.01); *H04W 76/14* (2018.02); *H04W 92/18* (2013.01)

(58) Field of Classification Search
CPC ............. H04W 28/0268; H04W 76/14; H04W 28/0273; H04W 92/18
See application file for complete search history.

(56) References Cited

U.S. PATENT DOCUMENTS

| 2017/0071028 A1* | 3/2017 | Kuo | .......................... H04W 8/06 |
| 2022/0086682 A1* | 3/2022 | Watfa | .................... H04W 76/15 |
| 2022/0141898 A1* | 5/2022 | Kim | ...................... H04W 76/14 |
| | | | 370/315 |

(Continued)

OTHER PUBLICATIONS

KI#3, New Sol: QoS handling for Remote UE, SA WG2 Meeting #139E S2-2003786, Samsung, Jun. 1-12, 2020, 3GPP, pp. 1-2 (Year: 2020).*

(Continued)

*Primary Examiner* — Jae Y Lee
*Assistant Examiner* — Nhu Pham
(74) *Attorney, Agent, or Firm* — Cooper Legal Group LLC

(57) ABSTRACT

A method and device are disclosed for a relay User Equipment (UE). In one embodiment, the relay UE establishes a first layer-2 link with a first remote UE. The relay UE also establishes a Protocol Data Unit (PDU) session with a network, wherein the relay UE forwards traffic of the first remote UE on the PDU session. The relay UE further establishes a second layer-2 link with a second remote UE. In addition, the relay UE forwards traffic of the second remote UE on the PDU session. Furthermore, the relay UE receives a network control signaling from the network, wherein the network control signaling is associated with the first remote UE and is used for modifying the PDU session. The relay UE also initiates a layer-2 link modification procedure toward the first remote UE in response to reception of the network control signaling.

20 Claims, 20 Drawing Sheets

(56) References Cited

U.S. PATENT DOCUMENTS

2023/0071287 A1 * 3/2023 Ahmad .............. H04L 63/0428
2024/0305980 A1 * 9/2024 Ferdi .................... H04W 12/06

OTHER PUBLICATIONS

Samsung, KI#3, New Sol: QoS handling for Remote UE, SA WG2 Meeting #139E S2-2003786, Jun. 1-12, 2020, pp. 1-2 (Year: 2020).*
Office Action from China National Intellectual Property Administration in corresponding CNIPA Application No. 202210554224.1, dated Jun. 27, 2024.
Samsung, "KI#3, New Sol: QoS handling for Remote UE", Agenda Item: 8.8, Work Item/Release: FS_5G_ProSe/Rel-17, S2-2003786, SA WG2 Temporary Document, SA WG2 Meeting #139E, Elbonia, Jun. 1-12, 2020.
Corresponding Korean Intellectual Property Office Application No. 10-2022-0061963, Office Action dated Sep. 30, 2024, 8 pages.
Samsung: "KI#3, New Sol: QoS Handling for Remote UE", SA WG2 Temporary Docment, SA WG2 Meeting #139E, S2-2003786, Elbonia, Jun. 1-12, 2020, 2 pages.

* cited by examiner

A. Dedicated Relay PDU Session Model: One PDU Session for one Remote UE

B. Shared Relay PDU Session Model: One PDU Session for multiple Remote UEs

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/191,035 filed on May 20, 2021, the entire disclosure of which is incorporated herein in its entirety by reference.

FIELD

This disclosure generally relates to wireless communication networks, and more particularly, to a method and apparatus for supporting UE-to-network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a relay User Equipment (UE). In one embodiment, the relay UE establishes a first layer-2 link with a first remote UE. The relay UE also establishes a Protocol Data Unit (PDU) session with a network, wherein the relay UE forwards traffic of the first remote UE on the PDU session. The relay UE further establishes a second layer-2 link with a second remote UE. In addition, the relay UE forwards traffic of the second remote UE on the PDU session. Furthermore, the relay UE receives a network control signaling from the network, wherein the network control signaling is associated with the first remote UE and is used for modifying the PDU session. The relay UE also initiates a layer-2 link modification procedure toward the first remote UE in response to reception of the network control signaling.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TR 23.752 V17.0.0, "Study on system enhancement for Proximity based Services (ProSe) in the 5G System (5GS) (Release 17)"; TS 23.287 V16.5.0, "Architecture enhancements for 5G System (5GS) to support Vehicle-to-Everything (V2X) services (Release 16)"; and TS 23.502 V16.5.1, "Procedures for the 5G System (5GS); Stage 2 (Release 16)". The standards and documents listed above are hereby expressly incorporated by reference in their entirety.

Figure 1:
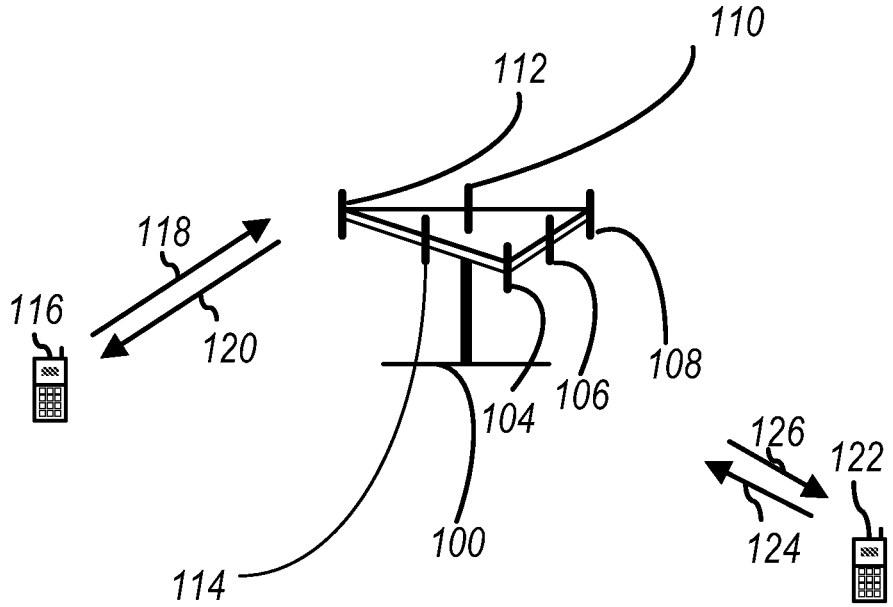
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
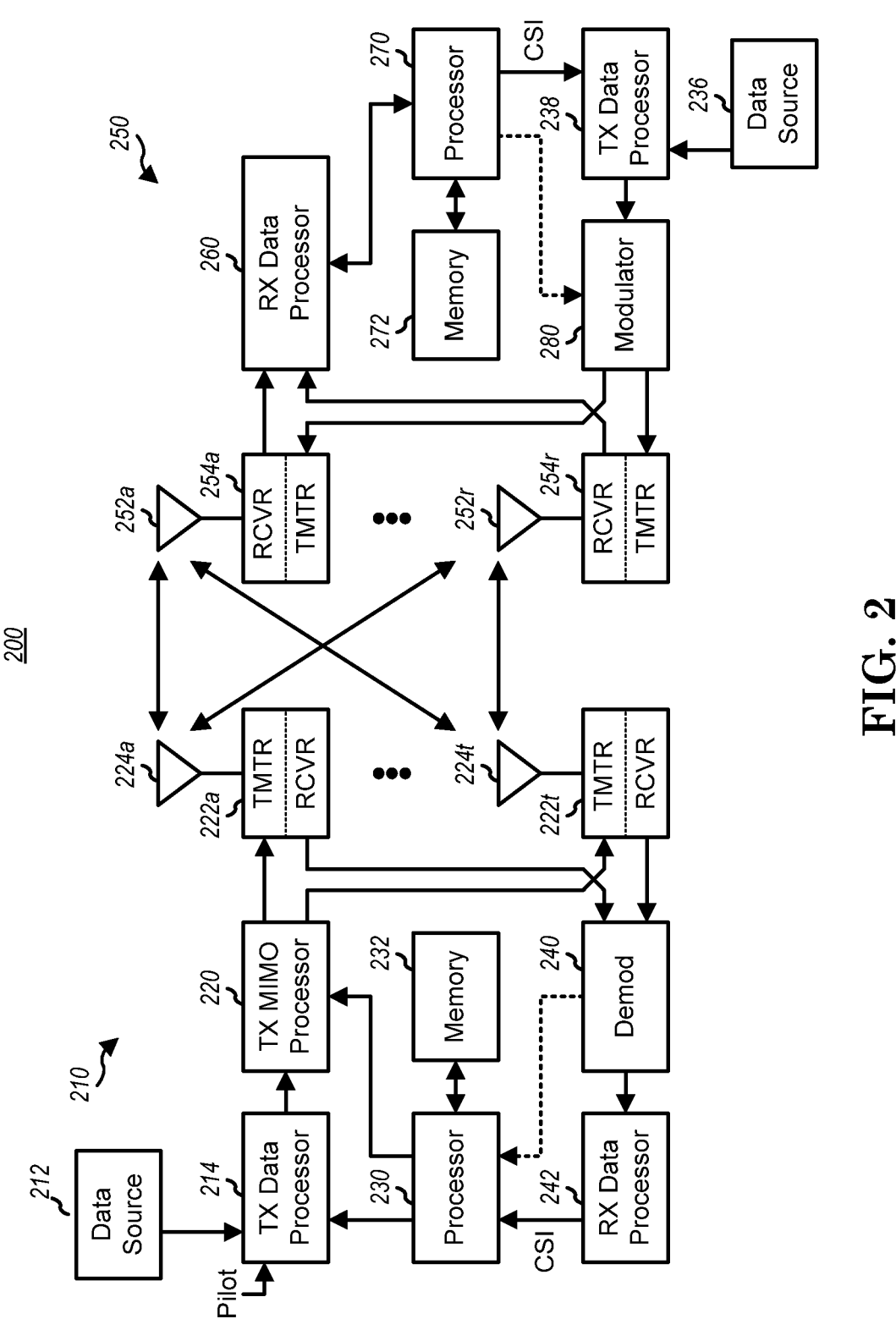
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
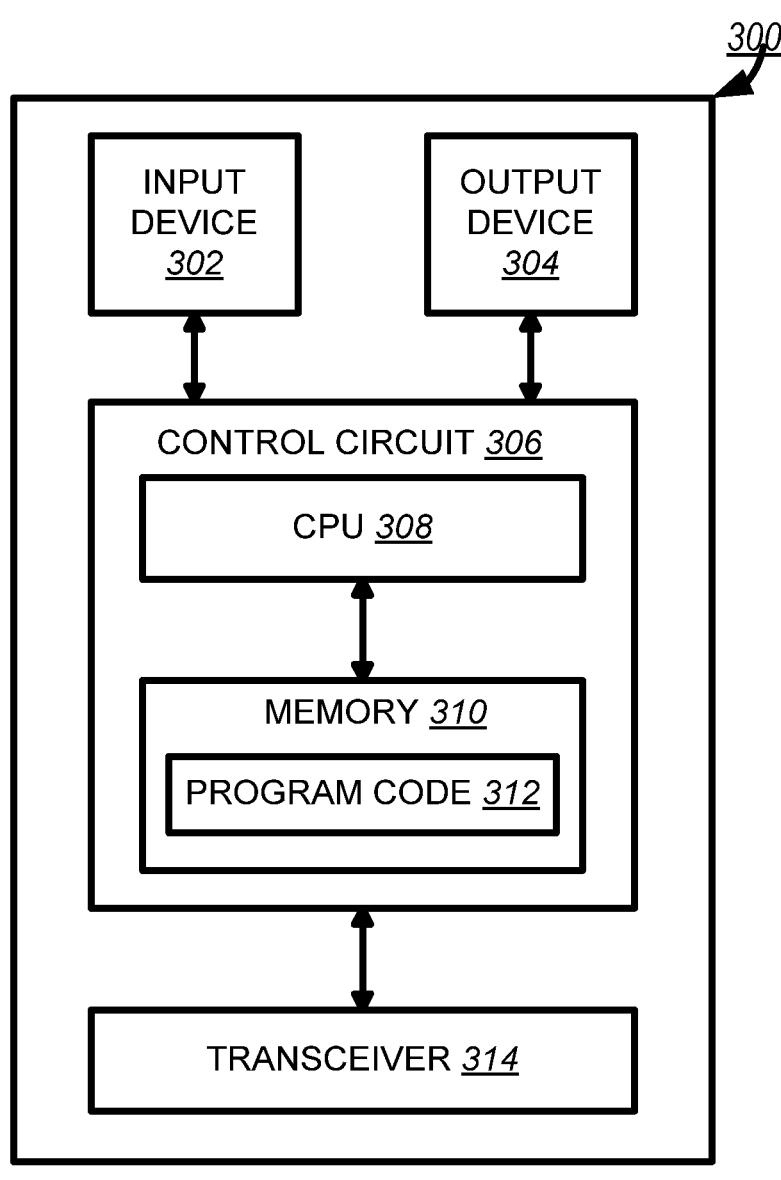
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
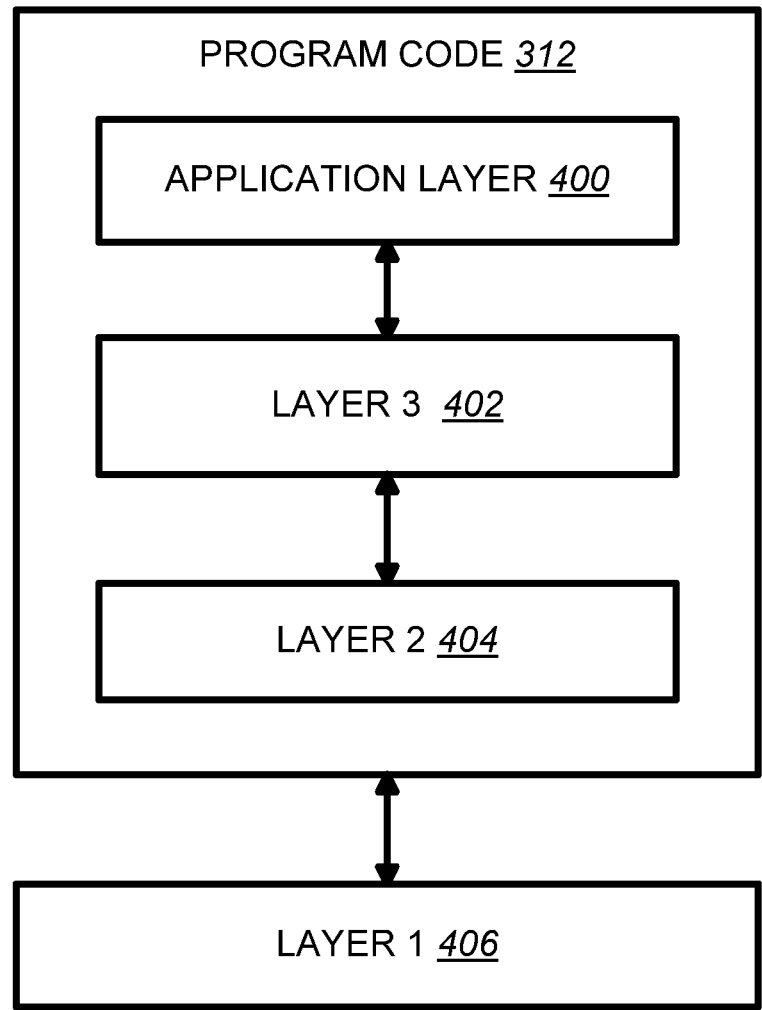
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TR 23.752 introduced the following:

8.3 Key Issue #3: Support of UE-to-Network Relay For Key Issue #3 (Support of UE-to-Network Relay), the followings are taken as interim conclusions:

UE-to-Network Relay conclusions are subject to confirmation from RAN WG2 and SA WG3 for normative work.

The final decision on whether or not to proceed with Layer-2 and/or Layer-3 into normative work will be made in cooperation with other WGs.

The following is taken as interim conclusions for the L3 UE-to-Network Relay solution:

No showstopper has been identified by SA WG2 for L3 UE-to-Network solution. SA WG2 recommends L3 UE-to-Network Relay proceed into normative work, subject to RAN WG2 and SA WG3 conclusion.

Solution #6 is taken as baseline in case the UE-to-Network Relay is a trusted entity by the Remote UE. Solution#23 is agreed to be used to provide end-to-end security for the Remote UE in case the UE-to-Network Relay is not a trusted entity by the Remote UE.

For L3 Relay discovery procedure, it is proposed to adopt the standalone discovery procedure (i.e. Model A and Model B), and, the additional information advertised by Relay UE as described in Sol#28 as the basis for normative work.

For the L3 relay operation support, Remote UE uses URSP rules to route the traffic on suitable communication path (as described in Sol#26).

For the PDU Session relaying the Remote UE's traffic, the Relay UE can determine PDU session parameters based on RSC requested by the Remote UE according to the association between RSC and PDU session parameters as described in Sol#35. The Remote UE can select the Relay UE according to the association between RSC and PDU session parameters as described in Sol#35.

NOTE 1: Whether the associations between PDU session parameters and ProSe Relay Service Codes are provided to Relay UE and Remote UE as ProSe policy/parameters or as USRP rules will be decided at normative phase. Whether Remote UE provides other assistant info for handling PDU session parameters, e.g. PDU session requirement or Traffic descriptors to Relay UE will be decided at normative phase. The security and privacy aspects of this procedure will be coordinated with SA WG3.

Security aspects require confirmation from SA WG3.

NOTE 2: The procedures to support authentication of Remote UE and Relay UE by the network will be determined by SA WG3.

For the Remote UE to use the network resources (e.g. PDU Session and Network Slice) of the Relay UE's serving network, the network-controlled authentication and authorization procedures (e.g. as proposed in Solution #40 and Solution #47) will be determined in the normative phase with coordination with SA WG3. The alignment with the associated security procedures to authenticate the Remote UE and Relay UE will be carried out in normative phase via coordination with SA WG3.

NOTE 3: No dedicated solution is documented in SA WG2 for the Network Slice Specific Authentication and Authorization (NSSAA) for a Remote UE. Whether and how to support of NSSAA for a Remote UE will be determined by SA WG3.

The secondary authentication for a Remote UE (e.g. as proposed in Solution #27) will be determined by SA WG3. The alignment with the associated security procedures for secondary authentication of the Remote UE will be carried out in normative phase via coordination with SA WG3.

For QoS handling of L3 Relay Solution associated with Solution #6, following aspects in Solution #24 and Option #2 of Solution #25 are selected as basis for normative work:

L3 Relay can be configured with the 5QIs and PQIs mapping. Based on the mapping or, in case of a non-configured mapping of a requested QoS parameter, based on its implementation, the L3 relay translates the Uu QoS parameters to PC5 QoS parameters and vice versa.

To support the dynamic QoS handling, relay UE determines the Uu QoS parameters and PC5 QoS parameters by taking into account the end-to-end QoS requirements provided by remote UE based on its configured QoS mapping information or, in case of a non-configured mapping of a requested QoS parameter, based on its implementation, and initiates PDU session modification procedure and L2 link modification procedure to setup corresponding QoS Flows over Uu and PC5.

The SMF of the L3 Relay provides the corresponding QoS rules and flow level QoS parameters to the L3 Relay as part of the PDU session establishment or modification procedures as defined in TS 23.502 [8], clause 4.3.2 and 4.3.3. Alternatively, reflective QoS control over Uu as defined in TS 23.501 [6], clause 5.7.5.3 can be leveraged for dynamic QoS handling of Remote UE to save on signalling between SMF and L3 Relay.

Based on signalled QoS rules (via SMF) or derived QoS rules (Uplink Uu via reflective QoS), the UE-to-Network Relay may use the L2 Link Modification procedures as defined in TS 23.287 [5], clause 6.3.3.4 to either move the corresponding ProSe service(s) to the mapped existing PC5 QoS flow or to set up a new PC5 QoS flow.

Editor's note: The radio aspects of relay (re-)selection criteria and procedures, and service continuity for L3 U2N Relay are still under discussion in RAN WG2 in TR 38.836 [32] and will be determined by RAN WG2.

6.6 Solution #6: Layer-3 UE-to-Network Relay 6.6.1 Description

This is a solution for key issue #3, UE-to-Network Relay.

Figure 6:
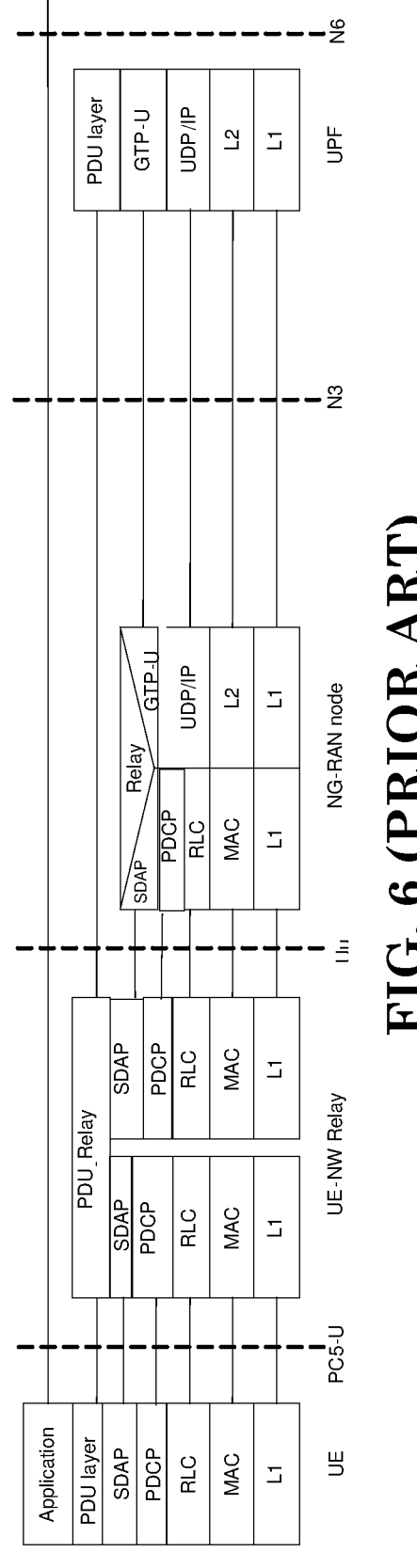
FIG. 6 is a reproduction of FIG. 6.6.1-2 of 3GPP TR 23.752 V17.0.0.

The ProSe 5G UE-to-Network Relay entity provides the functionality to support connectivity to the network for Remote UEs (see FIG. 6.6.1-1). It can be used for both public safety services and commercial services (e.g. interactive service).

A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage.

Remote UE may perform communication path selection between direct Uu path and indirect Uu path based on the link quality and the configured threshold (pre-configured or provided by NG-RAN). For example, if Uu link quality exceeds configured threshold, the direct Uu path is selected. Otherwise, the indirect Uu path is selected by performing the UE-to-Network Relay discovery and selection.

Figure 5:
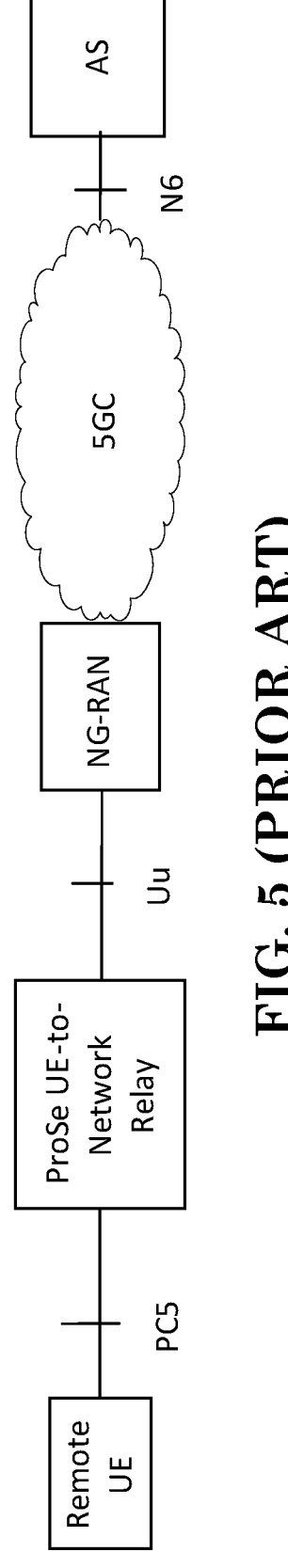
FIG. 5 is a reproduction of FIG. 6.6.1-13 of 3GPP TR 23.752 V17.0.0.

[Figure 6.6.1-13 of 3GPP TR 23.752 V17.0.0, Entitled "Architecture Model Using a ProSe 5G UE-to-Network Relay", is Reproduced as FIG. 5]

The ProSe 5G UE-to-Network Relay shall relay unicast traffic (UL and DL) between the Remote UE and the network. The ProSe UE-to-Network Relay shall provide generic function that can relay any IP, Ethernet or Unstructured traffic;

For IP traffic over PC5 reference point, the ProSe UE-to-Network Relay uses IP type PDU Session towards 5GC.

For Ethernet traffic over PC5 reference point, the ProSe UE-to-Network Relay can use Ethernet type PDU Session or IP type PDU Session towards 5GC.

For Unstructured traffic over PC5 reference point, the ProSe UE-to-Network Relay can use Unstructured type PDU Session or IP type PDU Session (i.e. IP encapsulation/de-capsulation by UE-to-Network Relay) towards 5GC.

The type of traffic supported over PC5 reference point is indicated by the ProSe UE-to-Network Relay e.g. using the corresponding Relay Service Code. The UE-to-Network Relay determines the PDU Session Type based on, e.g. ProSe policy/parameters, URSP rule, Relay Service Code, etc.

NOTE: How the UE-to-NW relay determines PDU session type should be evaluated independent from other part of this solution while considering other PDU session parameters, e.g. DNN, SSC mode.

IP type PDU Session and Ethernet type PDU Session can be used to support more than one Remote UEs while Unstructured type PDU Session can be used to support only one Remote UE.

NOTE 2: The maximum number of PDU Sessions can affect the maximum number of Remote UEs that the UE-to-Network Relay can support.

Editor's note: Support of non-unicast mode communication (i.e. one-to-many communication/broadcast or multicast) between network and UE-to-Network Relay UE and between UE-to-Network Relay and Remote UE(s) depends on the result of FS_5MBS work.

One-to-one Direct Communication is used between Remote UEs and ProSe 5G UE-to-Network Relays for unicast traffic as specified in solutions for Key Issue #2.

The protocol stack for Layer-3 UE-to-Network Relays is shown in FIG. 6.6.1-2.

[Figure 6.6.1-2 of 3GPP TR 23.752 V17.0.0, Entitled "Protocol Stack for ProSe 5G UE-to-Network Relay", is Reproduced as FIG. 6]

Hop-by-hop security is supported in the PC5 link and Uu link. If there are requirements beyond hop-by-hop security for protection of Remote UE's traffic, security over PDU layer needs to be applied.

Further security details (integrity and privacy protection for remote UE-Nw communication) will be specified in SA WG3.

According to the definition of service continuity in TS 22.261 [3] and TS 23.501 [6], it can be seen that "service continuity" is different from "session continuity" by definition, and service continuity can be achieved at application layer regardless of IP address preservation:

For Mission Critical Service in Public Safety, service continuity can be achieved by the application layer mechanism, e.g. as described in Annex B in TS 23.280 [29].

For commercial IMS use cases, service continuity can be achieved using mechanisms described in TS 23.237 [30].

For commercial use cases with application layer out of 3GPP scope (e.g. non IMS), service continuity can be achieved using similar way, e.g. QUIC.

It is noted that all of the above application layer mechanisms can be reused for Layer-3 UE-to-Network Relay without any enhancements in this study item.

6.6.2 Procedures

A ProSe 5G UE-to-Network Relay capable UE may register to the network (if not already registered) and establish a PDU session enabling the necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

Figure 7:
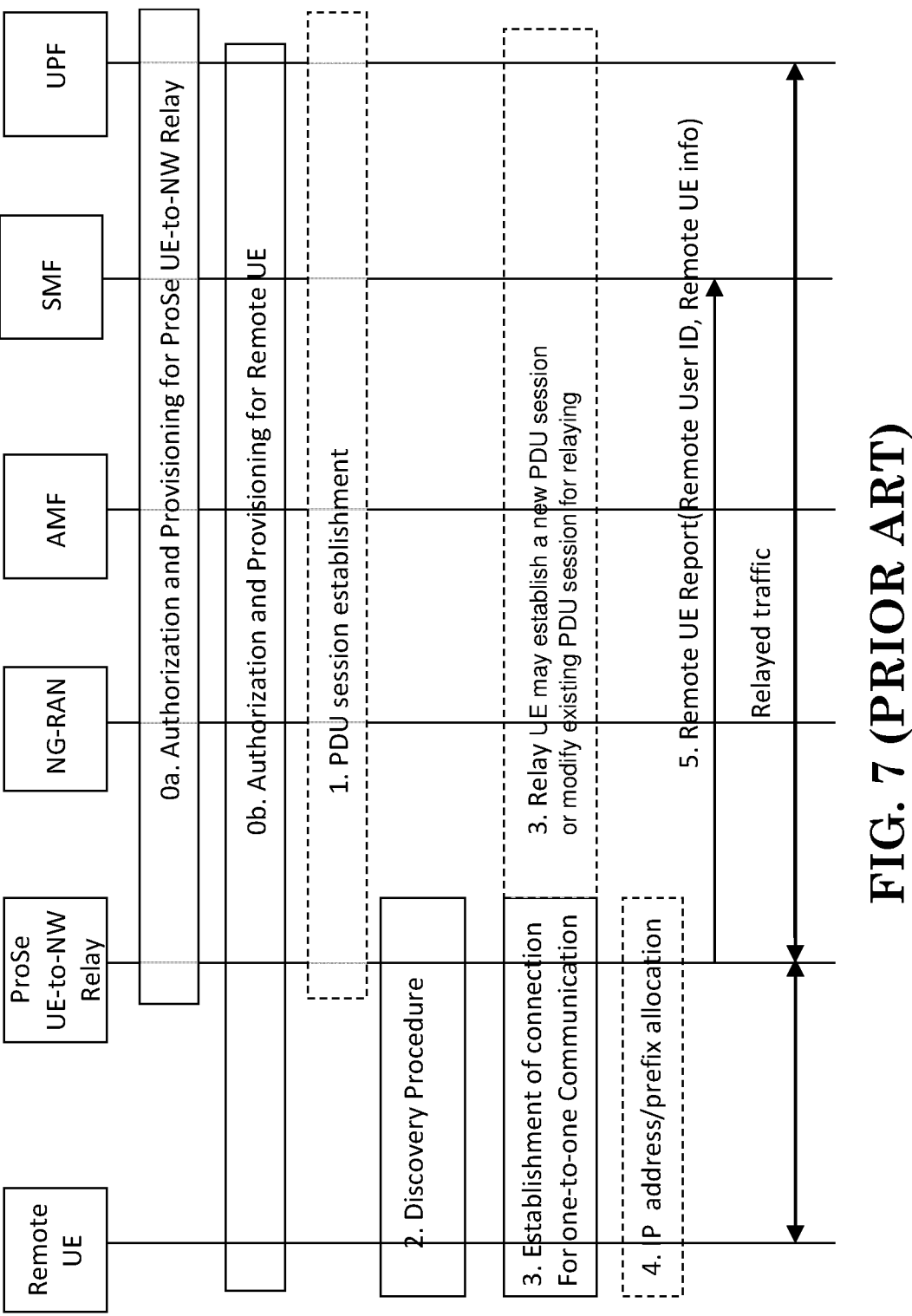
FIG. 7 is a reproduction of FIG. 6.6.2-1 of 3GPP TR 23.752 V17.0.0.

[Figure 6.6.2-1 of 3GPP TR 23.752 V17.0.0, Entitled "ProSe 5G UE-to-Network Relay", is Reproduced as FIG. 7]

0. During the Registration procedure, Authorization and provisioning is performed for the ProSe UE-to-NW relay (0a) and Remote UE(0b). Authorization and provisioning procedure may be any solution for key issue #1 and #3.

1. The ProSe 5G UE-to-Network Relay may establish a PDU session for relaying with default PDU session parameters received in step 0 or pre-configured in the UE-to-NW relay, e.g. S-NSSAI, DNN, SSC mode or PDU Session Type. In case of IP PDU Session Type and IPv6, the ProSe UE-to-Network Relay obtains the IPv6 prefix via prefix delegation function from the network as defined in TS 23.501 [6].

2. Based on the Authorization and provisioning in step 0, the Remote UE performs discovery of a ProSe 5G UE-to-Network Relay using any solution for key issue #1 and #3. As part of the discovery procedure the Remote UE learns about the connectivity service the ProSe UE-to-Network Relay provides.

3. The Remote UE selects a ProSe 5G UE-to-Network Relay and establishes a connection for One-to-one ProSe Direct Communication as described in TS 23.287 [5].

If there is no PDU session satisfying the requirements of the PC5 connection with the remote UE, e.g. S-NSSAI, DNN, QoS, the ProSe 5G UE-to-Network Relay initiates a new PDU session establishment or modification procedure for relaying.

According to the PDU Session Type for relaying, the ProSe 5G UE-to-Network Relay performs relaying function at the corresponding layer, e.g. acts as an IP router when the traffic type is IP, acts as an Ethernet switch when the traffic type is Ethernet, and performs generic forwarding for Unstructured traffic.

When the ProSe 5G UE-to-Network Relay uses Unstructured PDU session type for Unstructured traffic over PC5 reference point, it creates a mapping between the PC5 Link Identifier and the PDU Session ID, and a mapping between PFI for PC5 L2 link and the QFI for the PDU Session.

When the ProSe 5G UE-to-Network Relay uses IP PDU session type for Ethernet or Unstructured traffic over PC5 reference point, it locally assigns an IP address/prefix for the Remote UE and use that to encapsulate the data from the Remote UE. For downlink traffic, the ProSe 5G UE-to-Network Relay decapsulates the traffic from the IP headers and forwards to the corresponding Remote UE via PC5 reference point.

The ProSe 5G UE-to-Network Relay's subscription, and if applicable the Remote UE's subscription, can be considered for QoS decision. if the ProSe 5G UE-to-Network Relay reports Remote UE's SUCI to network, as described in sol#47 step 3,5,7, Relay UE's AMF gets Remote UE's SUPI from Remote UE's AUSF. Then Relay UE's AMF retrieves Remote UE's subscribed UE-AMBR from Remote UE's UDM using Remote UE's SUPI. Relay UE's AMF could also provide Remote UE's SUPI together with N1 SM container (PDU Session Establishment Request) to Relay UE's SMF, then Relay UE's SMF retrieves Remote UE's subscribed QoS profile and Subscribed Session-AMBR from Remote UE's UDM. Relay UE's AMF and SMF then provides Remote UE's subscription to PCF for QoS decision.

The UE-to-Network Relay distinguishes and performs the rate limitation for the traffic of a specific Remote UE, if the configuration from PCF supports to do that.

Editor's note: How the ProSe UE-to-NW relay determine the requirement of PC5 Connection, e.g. S-NSSAI, DNN, QoS will be specified in other solutions for KI#3.

Editor's note: How to support end-to-end QoS requirement of Remote UE, including QoS enforcement for PC5 and PDU session for relaying is addressed in other solutions.

4. For IP PDU Session Type and IP traffic over PC5 reference point, IPv6 prefix or IPv4 address is allocated for the remote UE as it is defined in TS 23.303 [9] clauses 5.4.4.2 and 5.4.4.3. From this point the uplink and downlink relaying can start. For downlink traffic forwarding, the PC5 QoS Rule is used to map the downlink IP packet to the PC5 QoS Flow. For uplink traffic forwarding, the 5G QoS Rule is used to map the uplink IP packet to the Uu QoS Flow.

Editor's note: General functionality for IPv6 prefix delegation as defined in TS 23.401 [25] clause 5.3.1.2.6 needs to be added in 5GS and reference to TS 23.501 [6] can be added above.

5. The ProSe 5G UE-to-Network Relay sends a Remote UE Report (Remote User ID, Remote UE info) message to the SMF for the PDU session associated with the relay. The Remote User ID is an identity of the Remote UE user (provided via User Info) that was successfully connected in step 3. The Remote UE info is used to assist identifying the Remote UE in the 5GC. For IP PDU Session Type, the Remote UE info is Remote UE IP info. For Ethernet PDU Session Type, the Remote UE info is Remote UE MAC address which is detected by the UE-to-Network Relay. For Unstructured PDU Session Type, the Remote UE info contains the PDU session ID. The SMF stores the Remote User IDs and the related Remote UE info (if available) in the ProSe 5G UE-to-Network Relay's SM context for this PDU session associated with the relay.

For IP info the following principles apply:
for IPv4, the UE-to-network Relay shall report TCP/UDP port ranges assigned to individual Remote UE(s) (along with the Remote User ID);
for IPv6, the UE-to-network Relay shall report IPv6 prefix(es) assigned to individual Remote UE(s) (along with the Remote User ID).

Editor's note: The privacy protection for Remote User ID depends on SA WG3 design.

The Remote UE Report message shall be sent when the Remote UE disconnects from the ProSe 5G UE-to-Network Relay (e.g. upon explicit layer-2 link release or based on the absence of keep alive messages over PC5) to inform the SMF that the Remote UE(s) have left.

In the case of Registration Update procedure involving SMF change the Remote User IDs and related Remote UE info corresponding to the connected Remote UEs are transferred to the new SMF as part of SM context transfer for the ProSe 5G UE-to-Network Relay.

NOTE 1: In order for the SMF to have the Remote UE(s) information, the HPLMN and the VPLMN where the ProSe 5G UE-to-Network Relay is authorised to operate, needs to support the transfer of the Remote UE related parameters in case the SMF is in the HPLMN.

NOTE 2: When Remote UE(s) disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing the measurement of the signal strength of PC5 unicast link with the ProSe 5G UE-to-Network Relay for relay reselection.

The solution can also work when the ProSe 5G UE-to-Network Relay UE connects in EPS using LTE. In this case for the Remote UE report the procedures defined in TS 23.303 [9] can be used.

6.6.3 Impacts on Services, Entities and Interfaces

The solution has impacts in the following entities:
SMF:
Needs to support procedures for Remote UE report.
UE:
Needs to support procedures for Remote UE and ProSe 5G UE-to-Network Relay.

6.24 Solution #24: End-to-End QoS Support for Layer-3 UE-to-Network Relay 6.24.1 General Description This solution addresses Key Issue#3 "Support of UE-to-Network Relay". Specifically, this solution addresses the aspects on "How to support end-to-end requirements between Remote UE and the network via a UE-to-Network Relay, including QoS (such as data rate, reliability, latency)" and "How the network allows and controls the QoS requirement for 5G ProSe UE-to-NW relay".

In Layer 3 UE-to-NW relay solution (Solution #6), the Remote UE's data flow is served by the Relay UE's PDU Session. As the UE-to-Network relay path comprises of two legs (PC5 and Uu) as shown in FIG. 6.24.1-1 below, the end-to-end QoS can be met only when the QoS requirements are properly translated and satisfied over the two legs respectively.

Figure 8:
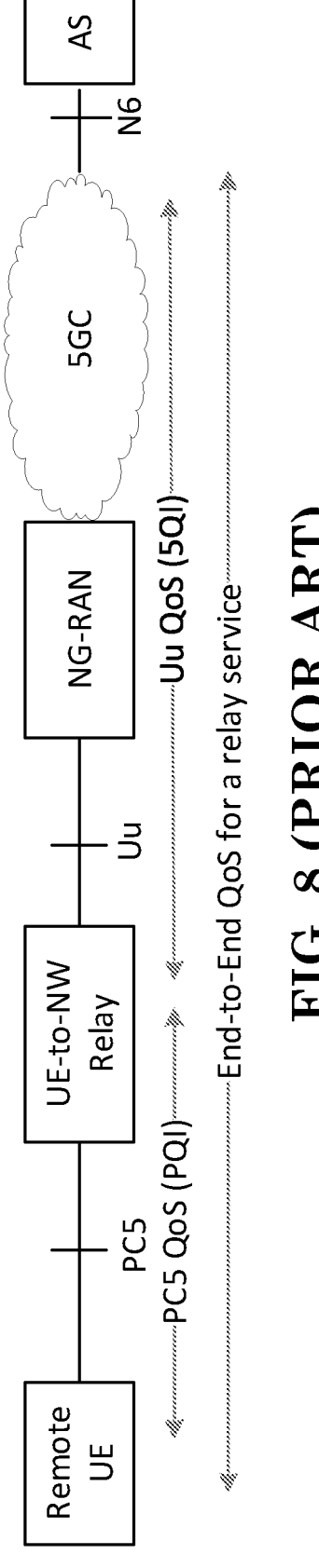
FIG. 8 is a reproduction of FIG. 6.24.1-1 of 3GPP TR 23.752 V17.0.0.

[Figure 6.24.1-1 of 3GPP TR 23.752 V17.0.0, Entitled "End-to-End QoS Translation for Layer 3 UE-to-Network Relay Solution", is Reproduced as FIG. 8]

The QoS requirements on the PC5 link are controlled with PC5 QoS rules and PC5 QoS parameters (PQI, GFBR, MFBR, PC5 LINK-AMBR, Range, etc) as specified in clause 5.4 of TS 23.287 [5]. The QoS requirements on the Uu link are controlled via with 5G QoS rules and 5G QoS parameters (501, GFBR, MFBR, etc) as specified in clause 5.7 of TS 23.501 [6].

The Uu leg's QoS is associated with the PDU Session established by the UE-to-Network Relay, and therefore the procedure as defined in TS 23.502 [8] clause 4.3.2 and 4.3.3 applies. The SMF of the UE-to-Network Relay would provide the corresponding QoS rules and flow level QoS parameters to the UE-to-Network Relay.

As explained above, the UE-to-Network Relay needs to translate the Uu QoS information into the corresponding PC5 QoS parameters in order to achieve the proper end-to-end QoS. Since the Remote UE and the UE-to-Network Relay uses PC5 unicast communication mode, most of the flow level QoS parameters can be directly reused. The only parameter that requires assistance in the translation is the mapping of 5QIs and PQIs. It is therefore necessary that the UE-to-Network Relay to be configured/provisioned with the proper mapping information. The mapping of 5QIs and PQIs are configured/provisioned at UE-to-Network Relay for a specific service or for a group of services. The 5QI for Uu and PQI for PC5 are used together to support the end-to-end QoS requirement.

Optionally, considering it has the possibility that the QoS info provided by Remote UE to UE-to-Network relay is E2E QoS requirement instead of PC5 part QoS requirement, so the proper mapping information to be configured/provisioned for UE-to-Network relay may be a mapping of E2E QoS to PC5 part QoS and Uu part QoS.

NOTE 1: The service or the group of services can be identified by Relay Service Code, IP 3-tuple(s), etc.

In case the QoS Flows setup are initiated by network, PCF or SMF decides the Uu part QoS parameters. Based on this information received from SMF, the UE-to-Network Relay deduces the PC5 part QoS parameters and establishes corresponding PC5 QoS Flows, using the procedure defined in TS 23.287 [5] clause 6.3.3.4. For example, after receiving the QoS rules and flow level parameters, the Relay UE determines the corresponding PC5 QoS Flows to establish and the mapping between the Uu QoS Flows and the PC5 QoS Flows.

In case that the Remote UE requested dedicated PC5 QoS Flows when establishing the L2 Link over PC5, the Remote UE gets the QoS mapping on the Relay UE via PC5 and decides the PC5 part QoS parameters (i.e. POI) by taking into account the received QoS mapping information, the UE-to-Network relay can map the PC5 QoS requirements into Uu QoS requirements based on the provisioned QoS mapping information or, if the mapping for the requested PC5 QoS parameter is not configured, based on its implementation, and perform the UE requested PDU session Modification as defined in TS 23.502 [8] clause 4.3.3.

In case that the QoS info provided by Remote UE to UE-to-Network relay is E2E QoS requirement instead of PC5 part QoS requirement, the UE-to-Network relay may perform the E2E QoS translation based on the configured/provisioned mapping of E2E QoS to PC5 part QoS and Uu part QoS, and then establish corresponding PC5 QoS flows and Uu QoS flows.

6.24.2 Enhancements to Support Dynamic QoS Handling

As shown in FIG. 6.24.1-1, the end-to-end connection from the Remote UE to the AS involves two over-the-air links, i.e. Uu and PC5. Therefore, to meet the PDB for a particular service, the AN PDB utilized by the NG-RAN needs to be reduced, in order to give some budgets for the PC5 link. Note that this is independent of whether L2 or L3 Relay architecture is used.

One way to achieve this without affecting the NG-RAN is for the SMF to modify the PDB signalled to the NG-RAN in the QoS Profile for the QoS Flows of the Remote UE's traffic. SMF follows the PCC rules (if it is PCF determined) or based on local configuration to deduct the PDB. When dynamic PCC control is supported, the SMF can base on the PCC rules to determine the PDB to use. Otherwise, SMF can base on pre-configuration, e.g. using DNN and/or S-NSSAI, to determine if and how to modify the PDB.

When dynamic PCC control is supported, it is possible that the AF may be able to request certain QoS handling of the traffic when the Remote UE initiated a session. This can be achieved by using the feature as defined in TS 23.503 [18] clause 6.1.3.22. The AF is able to locate the UE-to-Network Relay's PCF using the procedure as defined in TS 23.503 [18] clause 6.1.1.2, since the Remote UE uses an address belonging to the UE-to-Network Relay's PDU session.

The PCF can decide the Uu part QoS parameters and generate corresponding PCC rules, and the SMF in turn generate the QoS rules and flow level QoS parameters and signal to the UE-to-Network Relay using PDU Session Modification procedure. The UE-to-Network Relay then deduces the PC5 part QoS parameters based on the QoS mapping between 5QIs and PQIs, and uses the L2 Link Modification procedure defined in TS 23.287 [5] clause 6.3.3.4 to set up the related PC5 QoS flows.

NOTE: As UE-to-Network Relay uses the QoS mapping of 5QIs and PQIs to deduce the PC5 part QoS parameters, the end-to-end QoS requirements provided by AF which can't align with the QoS mapping between 5QIs and PQIs is not supported in this solution.

In case of network scheduled operation mode for NR PC5 is used, procedures defined in TS 23.287 [5] clause 5.4.1.4 is used to authorize the PC5 QoS requests related to the relay operation.

The UE-to-Network Relay's subscription, and if applicable the Remote UE's subscription, can be considered for QoS decision. NFs serving the UE-to-Network Relay could retrieve Remote UE's subscription, if the UE-to-Network Relay reports Remote UE's SUCI to network.

Alternatively, reflective QoS control over Uu as defined in TS 23.502 [8] clause 5.7.3.5 can be leveraged for dynamic QoS handling of remote UE. This can potentially save on signalling between SMF and UE-to-Network Relay UE to frequently modify the relaying PDU session over Uu.

Upon reception of a DL packet with RQI on the Uu for the remote UE, based on the indicated QFI, the UE-to-Network Relay derives or updates a QoS rule corresponding to the remote UE, as defined in TS 23.501 [6]. The derived rule is for UL packets from the remote UE at Uu interface. If the QFI to PC5 QoS flow mapping already exist, the UE-to-Network Relay may use the L2 Link Modification procedures as defined in TS 23.287 [5], clause 6.3.3.4 to move the corresponding ProSe service(s) to the mapped existing PC5 QoS flow (based on indicated QFI).

If the QFI to PC5 QoS flow mapping does not exist, the UE-to-Network Relay may determine the PQI based on the indicated 5QI (when the QFI is equivalent to a standardized 5QI), and sets up a new PC5 QoS Flow with the derived PQI using L2 Link Modification procedures as defined in TS 23.287 [5], clause 6.3.3.4.

When the UE-to-Network relay deletes the derived QoS rule e.g. after the RQ Timer expires, the UE-to-Network Relay resumes back to use the signalled QoS rule and performs L2 Link Modification procedures defined in TS 23.287 [5] clause 6.3.3.4 accordingly to use the PQI that corresponds to the 5QI of the existing signalled QoS rule.

6.24.3 Procedures

Existing procedures defined in TS 23.502 [8] and TS 23.287 [5] can be used to manage the QoS flows and PC5 QoS flows to serve the Remote UE.

6.24.4 Impacts on Services, Entities and Interfaces

The solution has impacts in the following entities:

SMF:

SMF optionally supports modifying the PDB for a QoS Flow serving the Remote UE based on either PCC rules or pre-configuration.

UE:

5G ProSe UE-to-Network Relay supports the mapping of Uu flow level QoS parameters to PC5 QoS parameters, including the mapping of 5QIs to PQIs, based on configuration or, for a non-configured mapping of a requested QoS parameter, based on its implementation.

5G ProSe UE-to-Network Relay supports the mapping of E2E QoS to Uu flow level QoS parameters and PC5 QoS parameters, including the mapping of E2E QoS to 5QIs and PQIs, based on configuration.

Remote UE may decide the PC5 part QoS parameters (i.e. PQI) based on the received QoS mapping from UE-to-Network Relay.

Remote UE gets the QoS mapping information from UE-to-Network Relay.

PCF:

supports to decide the Uu part QoS parameters and the PC5 part QoS parameters based on the E2E QoS parameters.

6.27 Solution #27: Secondary Authentication for a Layer 3 Remote UE 6.27.1 Description This is a solution for key issue #3, UE-to-Network Relay and based on Solution #6: Layer-3 UE-to-Network Relay. This solution is only applicable for Layer 3 UE-to-Network Relay. When a subscription indicates that secondary authentication is required, the Remote UE shall perform secondary authentication. Because Application cannot differentiate whether a UE is connected via UE-to-Network Relay or directly connected to the 5GC, if a UE connects to the application server without performing Secondary authentication, the application server may not provide service to the UE because application server may regard the UE as an abnormal UE. So secondary authentication should be supported even though a UE is connected via UE-to-Network Relay.

6.27.2 Procedures 6.27.2.1 Secondary Authentication after PC5 Link Setup

Figure 9:
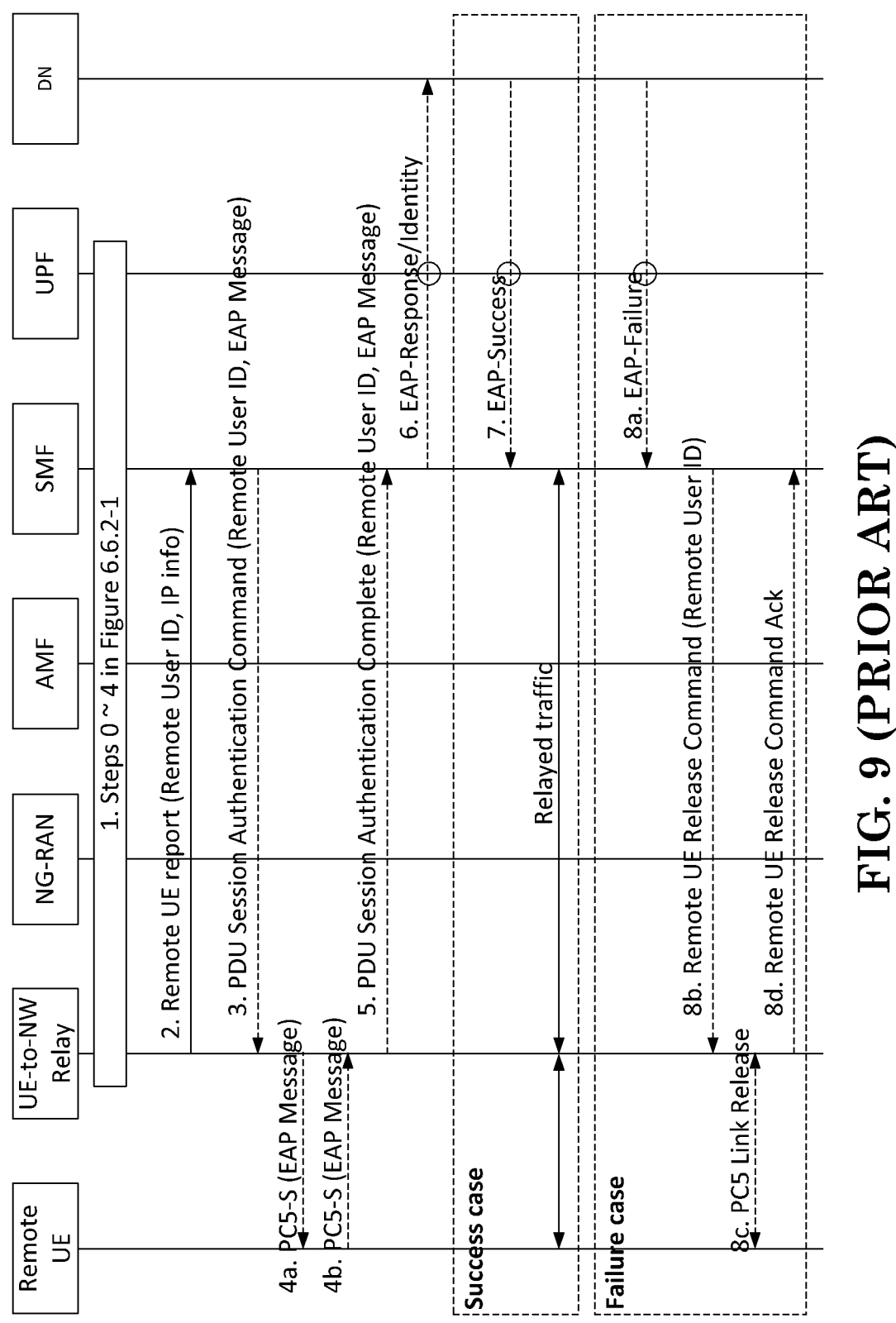
FIG. 9 is a reproduction of FIG. 6.27.2-1 of 3GPP TR 23.752 V17.0.0.

[Figure 6.27.2-1 of 3GPP TR 23.752 V17.0.0, Entitled "Secondary Authentication Procedure for a Remote UE (after PCS Link Setup)", is Reproduced as FIG. 9]

1. Steps 0~4 in FIG. 6.6.2-1.
2. Step 5 in FIG. 6.6.2-1. The ProSe 5G UE-to-Network Relay sends a Remote UE Report (Remote User ID, IP info) message to the SMF for the PDU session associated with the relay.
3. When the SMF received Remote UE Report, based on local configuration of the SMF, the SMF may retrieve subscription data of the Remote UE from the UDM and may perform Secondary authentication/authorization for the Remote UE. The SMF sends PDU Session Authentication Command message to the 5G ProSe UE-to-Network Relay including Remote User ID.
4. The 5G ProSe UE-to-Network Relay sends EAP message to the Remote UE via PC5 signalling. The Remote UE sends EAP message to the 5G ProSe UE-to-Network Relay via PC5 signalling.
5. The 5G ProSe UE-to-Network Relay sends PDU Session Authentication Complete message to the SMF including Remote User ID and EAP message received from the Remote UE.
6. The SMF sends EAP message to the DN-AAA.
7. If the authentication/authorization success, the DN-AAA sends EAP-Success to the SMF.

8. If the authentication/authorization fails, the DN-AAA sends EAP-Failure to the SMF. The SMF sends NAS message (e.g. PDU Session Modification, Remote UE Release Command) to the 5G ProSe UE-to-Network Relay. The NAS message includes Remote User ID to indicate the Remote UE and the 5G ProSe UE-to-Network Relay releases the PC5 link with the Remote UE.

NOTE 1: It is possible to perform secondary authentication procedure in parallel when multiple Remote UEs are connected to the 5G ProSe UE-to-Network Relay almost at the same time.

NOTE 2: The DN-AAA does not know whether a UE is connected via 5G ProSe UE-to-Network Relay or connected directly to the network.

Editor's note: Whether this solution can satisfy the security requirement (e.g. EAP message forwarded by UE-to-Network Relay) will be investigated and confirmed by SA WG3 group.

6.27.2.2 Secondary Authentication Before PC5 Link Setup

Figure 10:
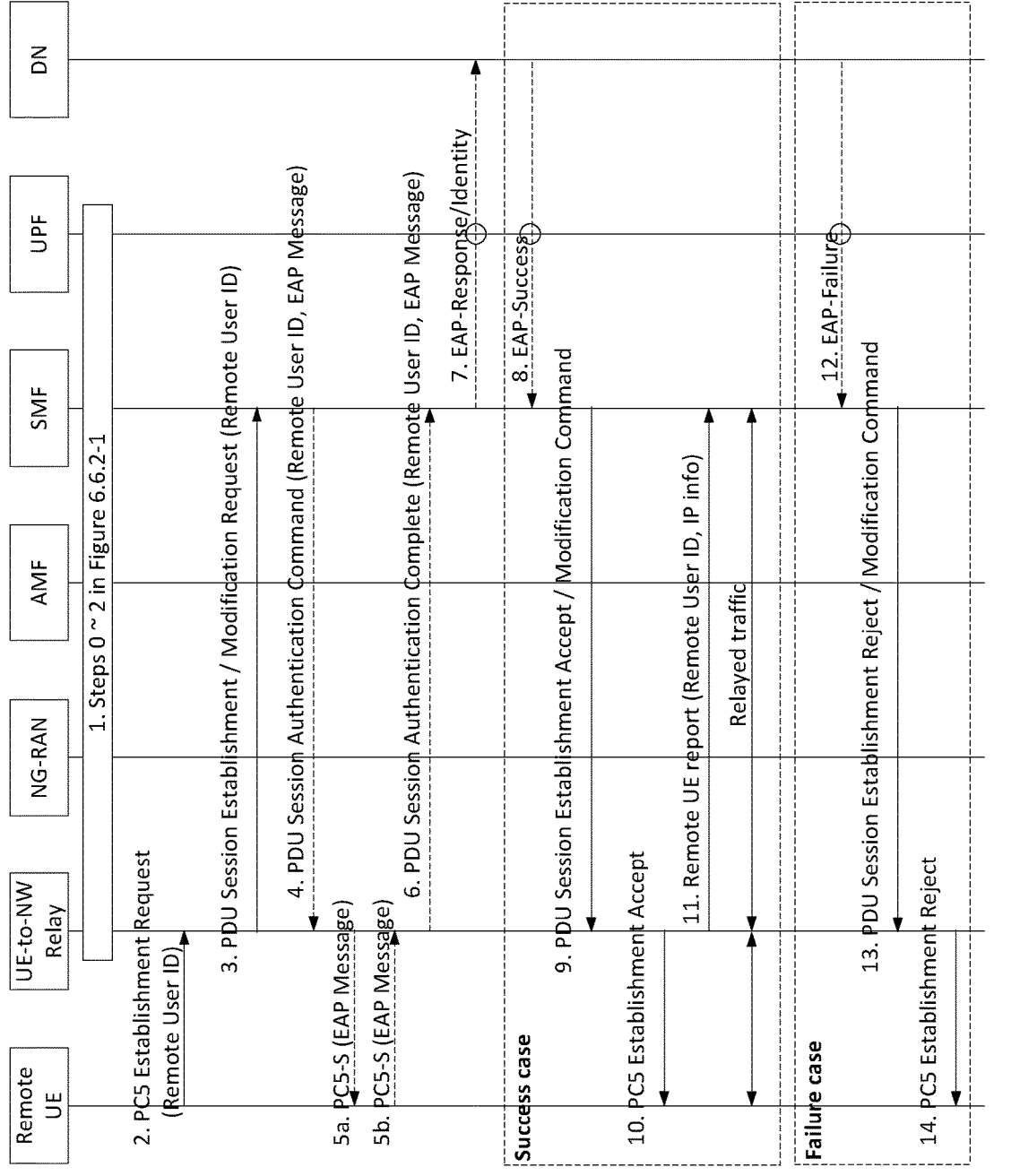
FIG. 10 is a reproduction of FIG. 6.27.2-1 of 3GPP TR 23.752 V17.0.0.

[Figure 6.27.2-1 of 3GPP TR 23.752 V17.0.0, Entitled "Secondary Authentication Procedure for a Remote UE (Before PCS Link Setup)", is Reproduced as FIG. 10]

1. Steps 0~2 in FIG. 6.6.2-1.
2. Remote UE establishes PC5 connection towards the 5G ProSe UE-to-Network Relay UE. When requesting UE-to-Network relaying over PC5, the Remote UE provides its Remote User ID to the 5G ProSe UE-to-Network Relay UE.
3. The 5G ProSe UE-to-Network Relay UE sends PDU Session Establishment or PDU Session Modification Request to the SMF and provides the Remote UE ID of the Remote UE.
4. When the SMF received Remote User ID, based on local configuration of the SMF, the SMF may retrieve subscription data of the Remote UE from the UDM and may perform Secondary authentication/authorization for the Remote UE. The SMF sends PDU Session Authentication Command message to the 5G ProSe UE-to-Network Relay including Remote User ID.
5. The 5G ProSe UE-to-Network Relay sends EAP message to the Remote UE via PC5 signalling. The Remote UE sends EAP message to the 5G ProSe UE-to-Network Relay via PC5 signalling.
6. The 5G ProSe UE-to-Network Relay sends PDU Session Authentication Complete message to the SMF including Remote User ID and EAP message received from the Remote UE.
7. The SMF sends EAP message to the DN-AAA.
8. If the authentication/authorization success, the DN-AAA sends EAP-Success to the SMF.
9. The SMF sends PDU Session Establishment Accept or PDU Session Modification Command to accept Remote UE's request.
10. The 5G ProSe UE-to-Network Relay UE sends PC5 connection accept message to the Remote UE.
11. Step 5 in FIG. 6.6.2-1.
12. If the authentication/authorization fails, the DN-AAA sends EAP-Failure to the SMF.
13. The SMF sends PDU Session Establishment Reject or PDU Session Modification Command to the 5G ProSe UE-to-Network Relay UE to reject Remote UE's request.
14. The 5G ProSe UE-to-Network Relay UE rejects PC5 connection establishment.

NOTE 1: It is possible to perform secondary authentication procedure in parallel when multiple Remote UEs are connected to the 5G ProSe UE-to-Network Relay almost at the same time.

NOTE 2: The DN-AAA does not know whether a UE is connected via 5G ProSe UE-to-Network Relay or connected directly to the network.

6.27.3 Impacts on Services, Entities and Interfaces

Remote UE:
send and receives EAP message via PC5 signalling;
execute secondary authentication with SMF.

UE-to-Network Relay UE:
includes Remote User ID in the PDU Session Authentication message and relays EAP message between Remote UE and SMF.
send Remote User ID via PDU Session Establishment or Modification message SMF:
decides whether to perform secondary authentication based on subscription of Remote UE;
execute secondary authentication with Layer 3 Remote UE:
when SMF performs secondary authentication for a Remote UE, Remote User ID is included in the PDU Session Authentication message;
if secondary authentication is failed, the SMF sends NAS message to release PC5 link or to reject PC5 link establishment.

6.40 Solution #40: Network Controlled Remote UE Authorization for UE-to-Network Relay 6.40.1 Description This solution addresses the Key Issue #3 described in the current document.

This solution supports UE-to-Network Relay Layer 3 Model.

This contribution compared to the existing Layer 3 based UE-to-Network solutions, it addressed two aspects.

1) Dedicated or shared PDU Session of UE-to-Network Relay UE.

2) Network controlled authorization of Remote UE.

For 1), this solution describes the two different UE-to-Network Relay PDU Session models as follows:

A. Dedicated Relay Session Model

In this model, one PDU Session of the UE-to-Network Relay is supported for one Remote UE as depicted in case A of the FIG. 6.40.1-1. The UE-to-Network Relay uses the PDU Session that is dedicated for only one Remote UE to relay the traffic between the Remote UE and the Data Network through the UPF of UE-to-Network Relay.

This dedicated relay session model is useful for the scenario where the network operator wants to differentiate the UE-to-Network Relay's PDU Session from charging and policy perspective and for the scenario where the network operator wants to provide different slice or data network per Remote UE's subscription.

B. Shared Relay Session Model

In this model, one PDU Session of UE-to-Network Relay is supported for multiple Remote UE as depicted in case B of the FIG. 6.40.1-1. The UE-to-Network Relay uses the PDU Session that is shared among multiple Remote UE to relay the traffic between the Remote UE(s) and the Data Network though the UPF of the UE-to-Network Relay.

The shared relay session model is useful for the scenario where the UE-to-Network Relay provides the internet connection to the multiple Remote UE(s). It is noted that the solution described in clause 6 of this document is based on this model.

16

The two relay session models are depicted as FIG. 6.40.1-1.

Figure 11:
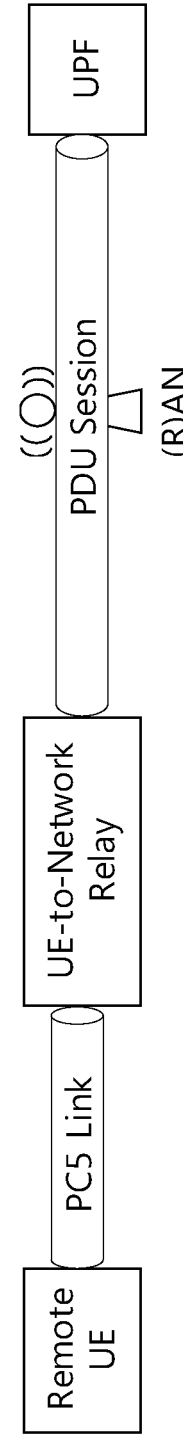
FIG. 11 is a reproduction of FIG. 6.40.1-1 of 3GPP TR 23.752 V17.0.0.
Figure 11:
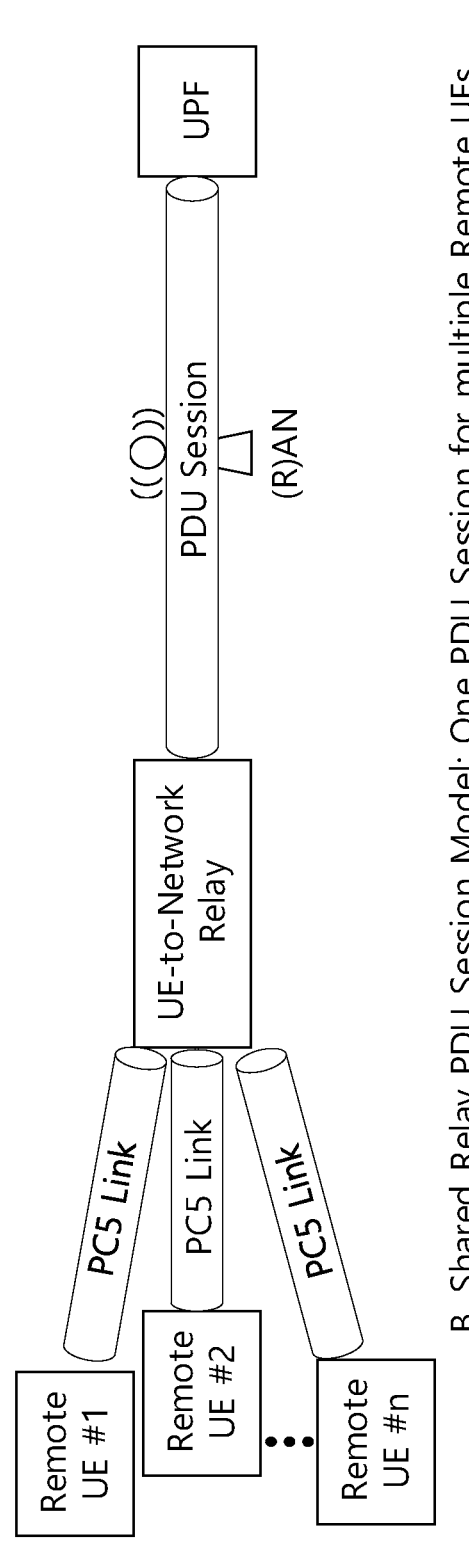

[Figure 6.40.1-1 of 3GPP TR 23.752 V17.0.0, Entitled "UE-to-Network Relay PDU Session: Dedicated Vs. Shared", is Reproduced as FIG. 11]

Unstructured type PDU Session is only applicable for the dedicated Relay Session Model. PDU Session with IP and Ethernet type can be applicable for both dedicated and shared relay session model.

For 2), in order for the network operator to authorize the remote UE to use the UE-to-Network Relay's PDU Session, a network controlled mechanism is used. In this solution, the 5GC can authorize the Remote UE based on the information provided by the UE-to-Network Relay that is connected to Remote UE. With this approach, the 5GC is able to authorize the Remote UE to use UE-to-Network Relay's PDU Session by checking the Remote UE's profile stored in UDM, PCF or DN-AAA in addition to UE-to-Network Relay's subscription information.

This solution assumes that Remote UE belongs to the same PLMN as Relay UE.

6.40.2 Procedures 6.40.2.1 Network Controlled Remote UE Authorization for the Dedicated/Shared Relay Session This procedure describes the Remote UE authorization procedure.

Figure 12:
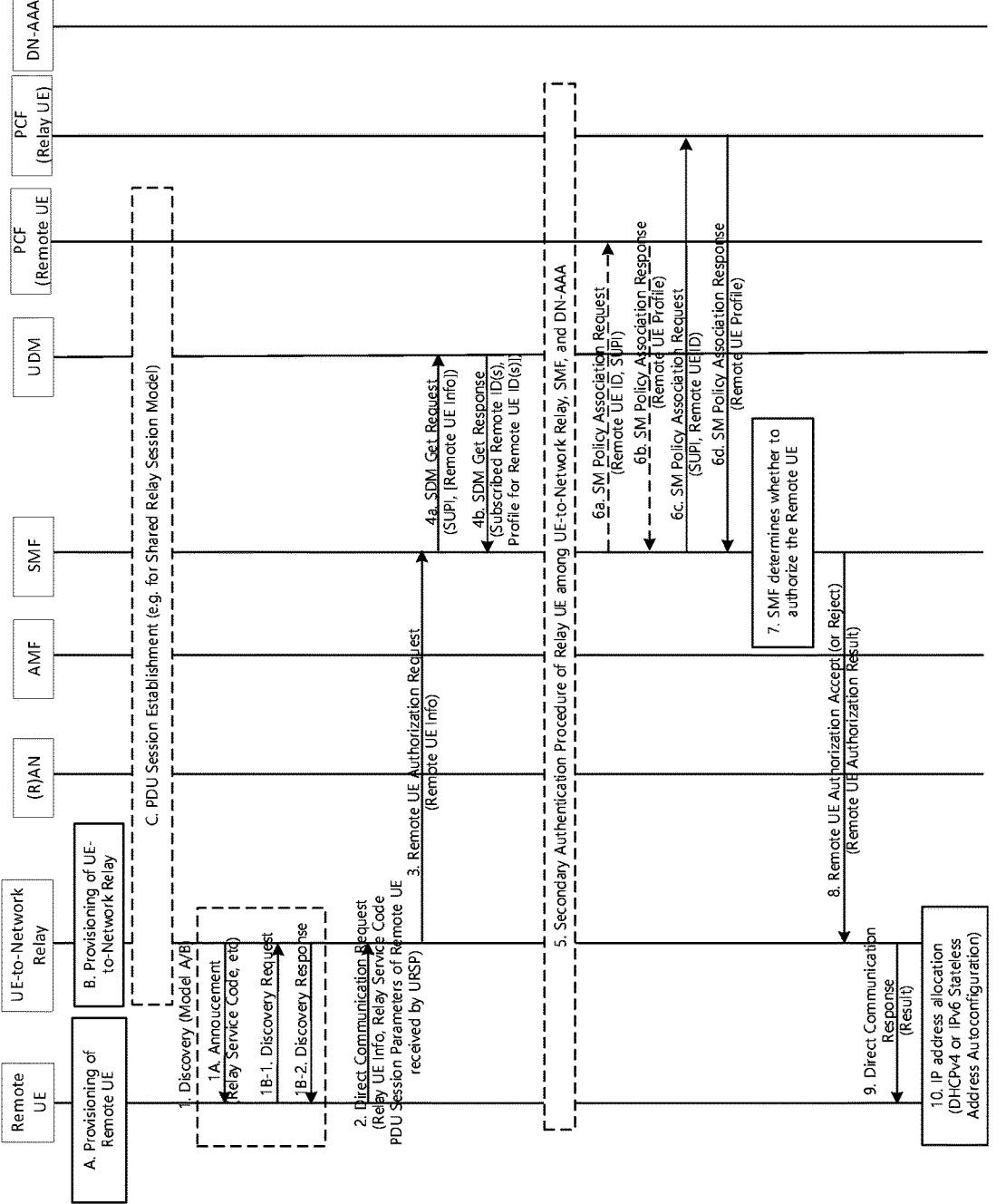
FIG. 12 is a reproduction of FIG. 6.40.2.1-1 of 3GPP TR 23.752 V17.0.0.

[Figure 6.40.2.1-1 of 3GPP TR 23.752 V17.0.0, Entitled "Network Controlled Remote UE Authorization", is Reproduced as FIG. 12]

0. Provisioning of Remote UE and UE-to-Network Relay. Provisioning of PC5 related information and URSP rules with ProSe extensions.

A. The Remote UE is provisioned with the information that can be used for connecting the UE-to-Network Relay through the PC5 link associated with the UE-to-Network Relay's PDU Session. The information includes the relay session service code for this procedure. The relay session code can be encoded to indicate dedicate or shared relay session model. In addition, the Remote UE can be provisioned with the appropriate UE Route Selection Policy such as ProSe UE-to-Network Offloading indicator with relay session model indicator as Route Selection Component. The relay session model indicator can indicator dedicated or shared relay session model. The information may include the authorization information (e.g. authorization token) issued by PCF.

NOTE 1: Security related issue can be determined and coordinated with SA WG3.

B. The UE-to-Network Relay is provisioned with the information that can be used for managing the PC5 reference points such as announcing the relay service code (e.g. dedicated relay session service code or shared relay session service code). The UE-to-Network may be provisioned with the network controlled authorization for network to authorize the Remote UE to use the UE-to-Network Relay's PDU Session.

In addition, the UE-to-Network Relay can be provisioned with the appropriate UE Route Selection Policy such as the relay session service (e.g. the dedicated relay session service or shared relay session service) or Remote UE information as Traffic Descriptor.

C. Based on the provisioned information in the step B. the UE-to-Network Relay may establish the PDU Session for shared relay session model. This step is applicable only for shared relay session model.

1. When performing the model A discovery procedure, the UE-to-Network relay provides the relay service code (e.g.

the dedicated relay session service code or the shared relay session service code) to the Remote UE. For the model B discovery procedure, the Remote UE may request the relay service code provisioned in the step OA.

2. After the Remote UE discovers the UE-to-Network Relay, the Remote UE initiates the establishment procedure of PC5 link associated with the dedicated UE-to-Network Relay's PDU Session. This message includes the Remote UE identification info such as the subscription identifier (such as SUCI or GPSI) or Layer 2 ID, Relay Service Code (e.g. dedicated/shared relay session service code), Remote UE authorization information and PDU Session related parameters if provisioned in the step OA. If the Relay UE identifies the Remote UE belongs to the different PLMN than Relay UE, the Relay UE can rejects the request.

3. On receiving the Direct Communication Request from the Remote UE, the UE-to-Network Relay may authorize the use of the UE-to-Network Relay's PDU Session based on the provisioned information received in the step OB. If the network controlled UE-to-Network relay authorization indicator and the relay session service code are provisioned in the step OB, the UE-to-Network Relay performs the PDU Session establishment procedure to authorize the Remote UE to use the UE-to-Network Relay's PDU Session. In this scenario, the UE-to-Network Relay sends the Remote UE authorization request and Remote UE identification information (i.e. received from the Remote UE in the step 2 and optional Remote UE authorization information) for the UE-to-Network Relay's PDU Session.

NOTE 2: The information carried in the step 3 can be transferred via PDU Session Establishment Request or PDU Session Modification Request with the Remote UE authorization request indicator.

4. On receiving the PDU Session request with the Remote UE authorization request, the SMF retrieves the subscription data of UE-to-Network Relay from the UDM, the subscription data includes the allowed list of Remote UE identification including optional Remote UE authorization information via the UE-to-Network Relay and their associated profiles for Remote UE(s). The associated profile may include the authorization profile indicating whether the secondary authentication or authorization token is required. To retrieve the specific profile of the Remote UE, the SMF may explicitly include the Remote UE identification information received in PDU Session Establishment Request when requesting the subscription information. If the operator policy requires the authorization token, but the Remote UE does not provide the authorization token, the SMF considers the authorization failure.

5. Based on the Remote UE authorization information if received from the Relay UE in the step 3 and the authorization profile if retrieved in the step 4, the SMF may initiate the secondary authentication/authorization procedure among the Remote UE, the SMF and DN-AAA. During this procedure, the UE-to-Network Relay relays the authentication messages between the Remote UE and the SMF.

6. The SMF may create an additional SM Policy Association with the PCF (of Remote UE) to authorize Remote UE's and Remote UE's profiles including PCC rules and SM policy if needed in the step 6*a/b*. To retrieve the policy for the Remote UE, the SMF sends the Remote UE's identification information including Remote UE authorization information (e.g. authorization token issued by the PCF) to the PCF.

The SMF retrieves policy and charging information for the UE-to-Network Relay's PDU Session supporting Remote UE from the PCF in the step 6*c/d*. To retrieve the policy for the Remote UE, the SMF sends the Remote UE's identification information to the PCF. The PCF of the Relay UE provides the policy and profile for the Remote UE associated with the UE-to-Network Relay.

NOTE 3: The information in the step 6 can be transferred via SM Policy Association Establishment Request/Response or SM Policy Association Modification Request/Response.

NOTE 4: The Remote UE profile index for PCC rules or QoS profiles corresponding Remote UE is sent from the PCF (of the Remote UE) to the SMF. The SMF may send the profile index with additional parameters received from the PCF (of the Remote UE) to the PCF (of the Relay UE) to retrieve the PCC rules or QoS profiles from the PCF (of the Relay UE).

7. The SMF determines to authorize the use of the UE-to-Network Relay's PDU Session for the Remote UE based on the subscription profile retrieved in the step 4, authorization result received in the step 5 and policy/authorization result of the Remote UE associated with UE-to-Network Relay retrieved in the step 6. The SMF also authorizes the requested PDU Session parameters such as S-NSSAI, DNN and PDU Session Type are supported by Remote UE's profile.

8. If the authorization is successful, the UE-to-Network sends the Remote UE Authorization Accept message with the authorization result. Otherwise the UE-to-Network sends Remote UE Authorization Reject with failure result and an appropriate cause.

NOTE 5: The information in the step 3 can be transferred via PDU Session Establishment Accept/Reject if the step 3 is carried through PDU Session Establishment Request with the Remote UE authorization request indicator.

9. If the Remote UE authorization request for the dedicate or shared use of UE-to-Network Relay is successful, the UE-to-Network Relay may determines the successful setup of the PC5 link with appropriate parameters. Otherwise, the UE-to-Network Relay rejects the establishment PC5 link due to failure of authorization.

10. For the case IP address allocation is performed with separate procedure such as DHCP or IPv6 SLAAC, IP address allocation procedure may be performed.

11. The UE-to-Network reports the Remote UE info to the SMF.

6.40.3 Impacts on Services, Entities and Interfaces

The following noes and functionalities are impacted:

Remote UE supports the provisioning for the dedicated and shared relay session model.

UE-to-Network Relay supports the provisioning for the dedicated and shared relay session model and Remote UE authorization procedure.

SMF supports the dedicated and shared relay session model and Remote UE authorization.

UDM supports the allowed Remote UE list and associated profile.

PCF (of Relay UE) supports the Remote UE's profile associated with the UE-to-Network Relay's PDU Session.

PCF (of Remote UE) supports the issues and verification of the Remote UE's authorization information and provides the pre-configured Remote UE profile.

6.47 Solution #47: Authorizing a UE to be a 5G UE-to-Network Relay and how to Authorize a UE to Access 5GC Via a 5G UE-to-Network Relay 6.47.1 Description This is a solution for key issue #3, UE-to-Network Relay and it applies to L3 Relay. The principles are as follows:

During registration, the UE gets info if it is authorized to be a Relay. The AMF gets info PLMNs whose UEs can relay data over this Relay UE.

During PC5 connection establishment, the Remote UE provides its UE ID to the Relay UE which sends that info to the AMF to get authenticated and authorization:

the Relay UE's AMF initiate authentication for the Remote UE towards the Remote UE's AUSF;

After the remote UE is authenticated, the Relay UE's AMF initiates authorization check towards the remote UE's UDM if the UE can act as Remote UE and if it can be connected to the Relay UE.

Remote UE authorisation returns the Remote UE GPSI which allows relay authorisation in the Relay network.

The need for functionality in step 5 and onwards depends on security requirements of the application.

Editor's note: The authentication and authorization aspects depend also on the study in SA WG3.

6.47.2 Procedures

Figure 13:
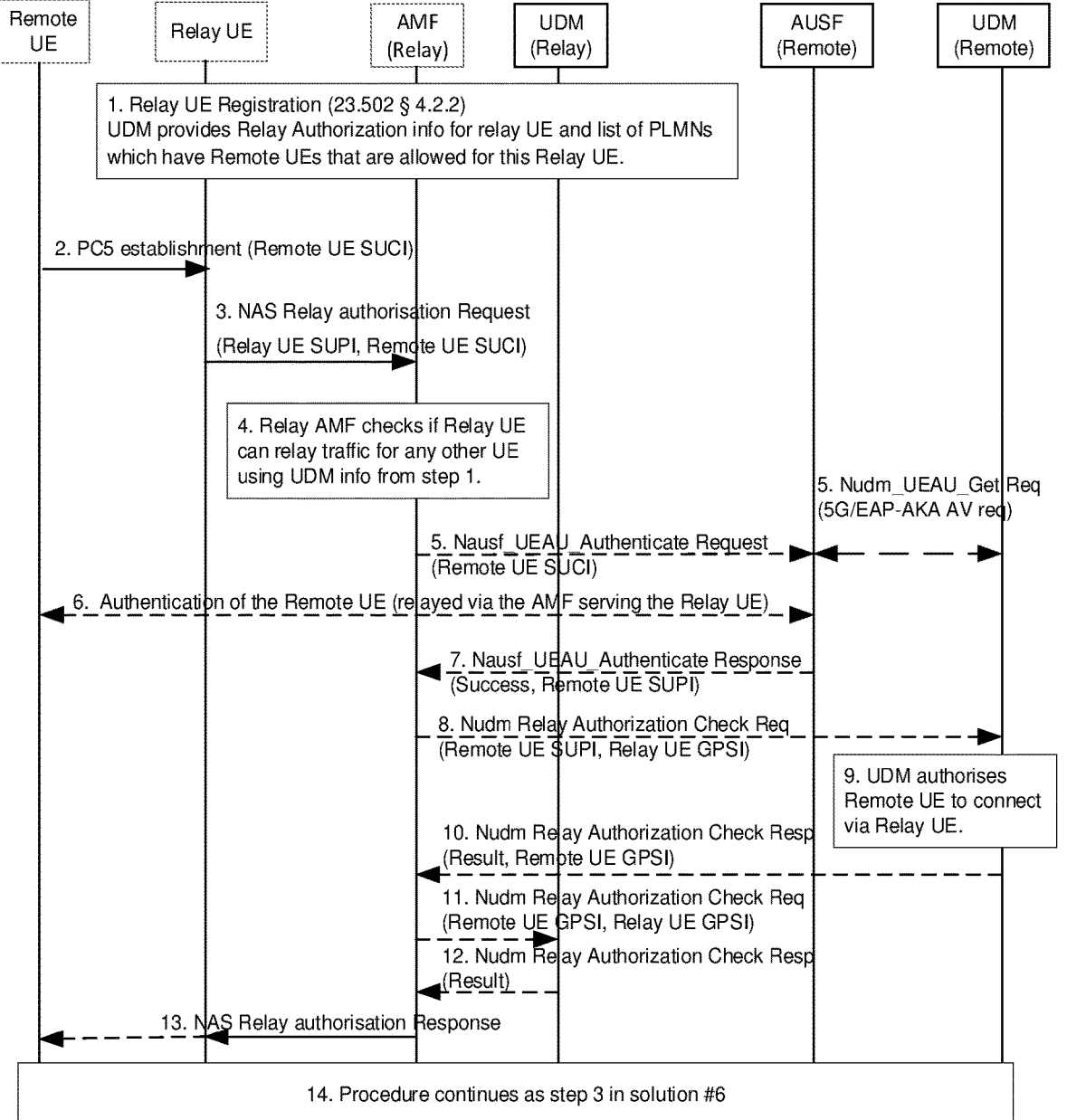
FIG. 13 is a reproduction of FIG. 6.47.2-1 of 3GPP TR 23.752 V17.0.0.

The connection of a Remote UE via a Relay UE works according to high level steps described in FIG. 6.47.2-1. The proposed authorisation procedure can be triggered in PC5 link establishment between the remote UE and the relay UE. [Figure 6.47.2-1 of 3GPP TR 23.752 V17.0.0, Entitled "Authorizing a UE to Access 5GC Via a 5G UE-to-Network Relay", is Reproduced as FIG. 13]

1. The Relay UE registers (see TS 23.502 [8] clause 4.2.2.2).

The Relay AMF gets from the UDM the relay authorisation info for the Relay UE. The UDM may also include a list of all PLMNs where there is at least one allowed Remote UE for the Relay UE.

2. Remote UE provides its SUCI in PC5 connection establishment phase. For example, the Remote UE can provide its SUCI in PC5 Direct Communication Request message to the Relay UE.

NOTE 1: How the remote UE discovers the Relay UE is independent of this solution. Discovery can be based on methods defined in TS 23.287 [5] or in other solutions of this TR.

3. The Relay UE requests authorisation for UE-to-Network relaying from its serving AMF and provides the SUCI of the Remote UE and Relay UE SUPI.

NOTE 2: It assumed that UE-to-Network relay authorisation is NAS signalling and it is expected that CT groups specify the stage 3 messages.

4. [Conditional] If information on PLMNs of allowed Remote UEs for relaying was received in step 1, then based on this information, the Relay UE's AMF checks if the there are any UEs in the PLMN identified by the Remote UE SUCI for which the UE can act as a Relay UE. If not, the Relay UE's AMF informs the relay UE and the PC5 connection is rejected. Otherwise the Relay AMF continues the procedure.

Editor's note: Whether the list of PLMNs is provided to AMF at step 1 and AMF performs verification prior to primary authentication is to be confirmed with SA WG3.

NOTE 3: At this point, the Relay UE's AMF cannot know the GPSI of the Remote UE, so it cannot authorise relaying before step 10.

5-7. Based on the relay authorisation info received in the step 1 or serving PLMN's local policy, the Relay UE's AMF initiate authentication towards the remote UE's AUSF using existing procedures as defined in TS 33.501 [31].

The authentication is signalled transparently via the Relay UE and the AMF serving it. Part of the signalling may be encrypted and can be decrypted by the Remote UE.

NOTE 4: Security related aspects need to be coordinated with by SA WG3.

As a result of the successful authentication of the remote UE, the Relay UE's AMF receives the SUPI of the remote UE.

8. After the remote UE is authenticated, the Relay UE's AMF initiates authorisation check by providing both the Relay UE's ID (e.g. GPSI) and Remote UE's SUPI to the UDM of the remote UE.

9. Remote UE's UDM checks if the Remote UE is authorised to send its traffic via Relay UE.

10. Remote UE's UDM responds to the Relay UE's AMF, and includes the result and the Remote UE's GPSI if authorisation is successful. If the authorisation fails, the Relay UE's AMF informs the Relay UE and the PC5 connection is rejected. Otherwise the Relay's UE's AMF continues the procedure.

NOTE 5: The service operation and the point of enforcement for the remote UE's authorization check with the remote UE's UDM can be decided during normative phase. For example, the Relay UE's AMF may enforce the authorisation after receiving the authorisation information and/or Remote's UE subscription data from the remote UE's UDM (via existing Nudm_SDM_Get service operation).

11. The Relay UE's AMF initiates authorisation check by providing both the Remote UE GPSI and Relay UE GPSI to the Relay UDM.

12. Relay UDM checks if the Relay UE is authorised to relay the traffic of the Remote UE and responds with authorisation result.

13. The Relay UE's AMF sends Authorisation result to the Relay UE. The Relay UE may forward the authorisation result to the remote UE if required, e.g. via the Discovery Response message or Direct Communication Accept message. If the authorisation fails, the relay UE shall not respond to the discovery request message or shall reject PC5 connection establishment if the authorisation failed.

NOTE 6: Whether the authorisation result needs security protection, e.g. to prevent the relay UE from modifying it, is expected to be addressed by SA WG3.

14. Procedure continues depending on the L3 procedure, e.g. step 3 in clause 6.6.2 if the authorisation is successful.

6.47.3 Impacts on Services, Entities and Interfaces

This solution impacts the following system entities.

Remote UE:

Capability to provide SUCI for Relay UE for authorisation.

Capability to support the authentication procedure via Relay UE.

Relay UE:

Capability to request authorisation for Remote UE identified by SUCI.

Capability to relay the authentication procedure towards the Remote UE.

AMF/UDM:

Support new service operation Nudm_Check_Authorization or using the exciting Nudm_SDM_Get. For a UE authorized to be a remote UE, the AMF checks if another UE can act as its Relay for this particular UE.

Verification whether candidate Relay UE is allowed to act as Relay UE for any other UE.

For a UE authorized to be Relay, AMF checks if another Remote UE can relay its traffic via this Relay.

The UDM is provisioned with association between all authorised Remote UEs and Relay UE to allow the AMF to decide whether the Remote UE is allowed to access via the Relay UE.

3GPP TS 23.287 introduced the following:

6.3.3.1 Layer-2 Link Establishment Over PC5 Reference Point

To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 14:
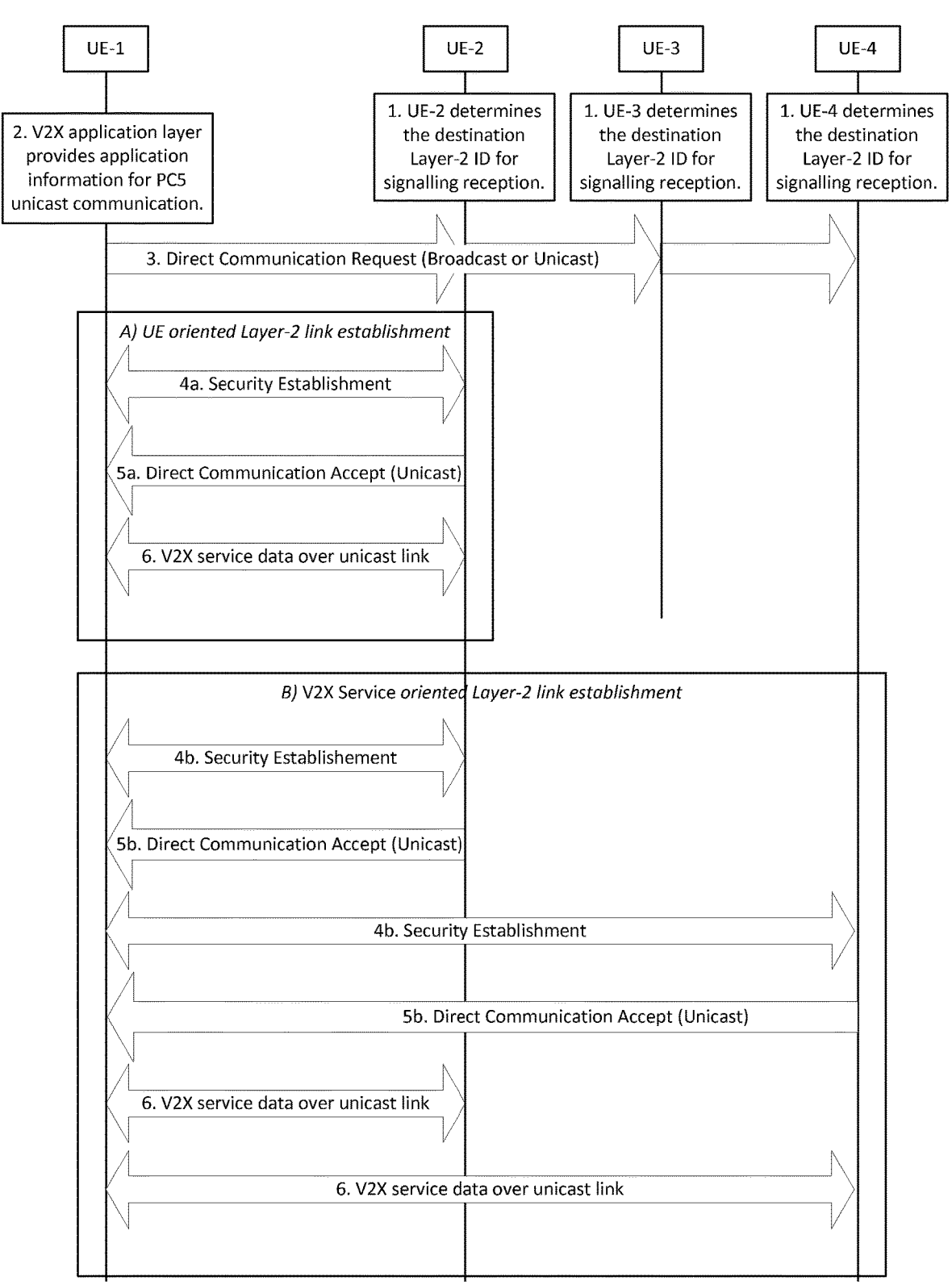
FIG. 14 is a reproduction of FIG. 6.3.3.1-1 of 3GPP TS 23.287 V16.5.0.

[Figure 6.3.3.1-1 of 3GPP TS 23.287 V16.5.0, Entitled "Layer-2 Link Establishment Procedure", is Reproduced as FIG. 14]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.

2. The V2X application layer in UE-1 provides application information for PC5 unicast communication. The application information includes the V2X service type(s) and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X service type(s) requesting Layer-2 link establishment.

Security Information: the information for the establishment of security.

NOTE 1: The Security Information and the necessary protection of the Source User Info and Target User Info are defined in TS 33.536 [26].

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X service type(s)

over a PC5 unicast link with UE-1 responds by establishing the security with UE-1.

NOTE 2: The signalling for the Security Procedure is defined in TS 33.536 [26].

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

If IP communication is used:

IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

6.3.3.4 Layer-2 Link Modification for a Unicast Link

FIG. 6.3.3.4-1 shows the layer-2 link modification procedure for a unicast link. This procedure is used to:

add new PC5 QoS Flow(s) in the existing PC5 unicast link.

This covers the case for adding new PC5 QoS Flow(s) to the exisiting V2X service(s) as well as the case for adding new PC5 QoS Flow(s) to new V2X service (s).

modify existing PC5 QoS Flow(s) in the existing PC5 unicast link.

This covers the case for modifying the PC5 QoS parameters for existing PC5 QoS Flow(s).

This also covers the case for removing the associated V2X service(s) from existing PC5 QoS Flow(s) as well as the case for associating new V2X service(s) with existing PC5 QoS Flow(s).

remove existing PC5 QoS Flow(s) in the existing PC5 unicast link.

Figure 15:
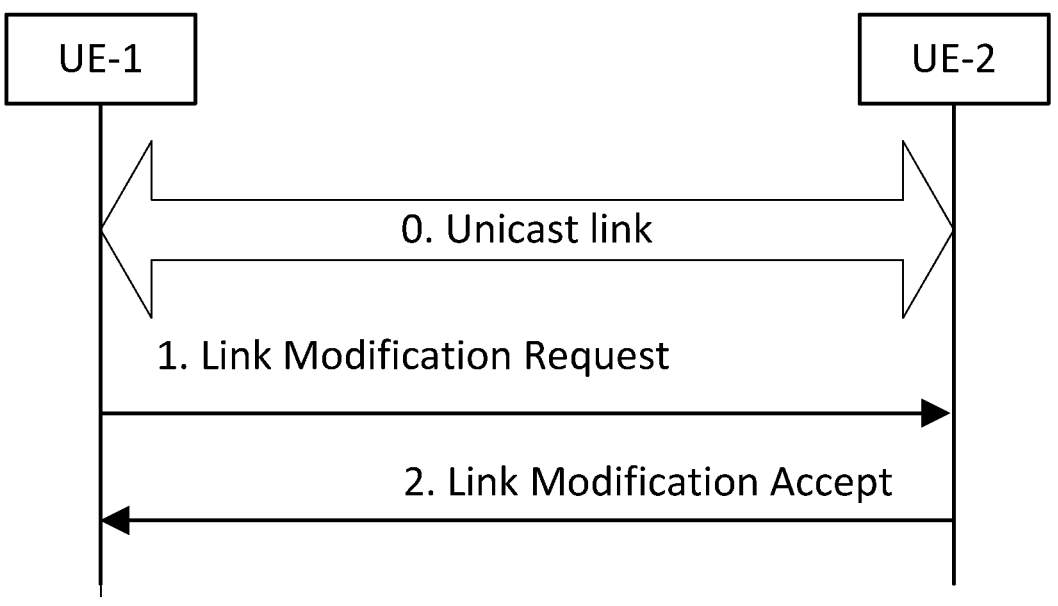
FIG. 15 is a reproduction of FIG. 6.3.3.4-1 of 3GPP TS 23.287 V16.5.0.

[Figure 6.3.3.4-1 of 3GPP TS 23.287 V16.5.0, Entitled "Layer-2 Link Modification Procedure", is Reproduced as FIG. 15]

0. UE-1 and UE-2 have a unicast link established as described in clause 6.3.3.1.

1. The V2X application layer in UE-1 provides application information for PC5 unicast communication. The application information includes the V2X service type(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.

The Link Modification Request message includes:

a) To add new PC5 QoS Flow(s) in the existing PC5 unicast link:

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).

b) To modify PC5 QoS Flow(s) in the existing PC5 unicast link:

QoS Info: the information about PC5 QoS Flow(s) to be modified. For each PC5 QoS Flow, the PFI, the corresponding PC5 QoS parameters (i.e. PQI and conditionally other parameters such as MFBR/GFBR, etc.) and the associated V2X service type(s).

c) To remove PC5 QoS Flow(s) in the existing PC5 unicast link:

PFI(s).

2. UE-2 responds with a Link Modification Accept message.

The Link Modification Accept message includes:

For case a) and case b) described in step 1:

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

The V2X layer of each UE provides information about the unicast link modification to the AS layer. This enables the AS layer to update the context related to the modified unicast link.

3GPP TS 23.502 introduced the following:

4.3.3 PDU Session Modification 4.3.3.1 General

The procedure is used when one or several of the QoS parameters exchanged between the UE and the network are modified.

NOTE: The conditions when to use this procedure for QoS change as well as the QoS parameters exchanged between the UE and the network are defined in TS 23.501 [2] clause 5.7.

4.3.3.2 UE or Network Requested PDU Session Modification (Non-Roaming and Roaming with Local Breakout)

The UE or network requested PDU Session Modification procedure (non-roaming and roaming with local breakout scenario) is depicted in FIG. 4.3.3.2-1.

Figure 16:
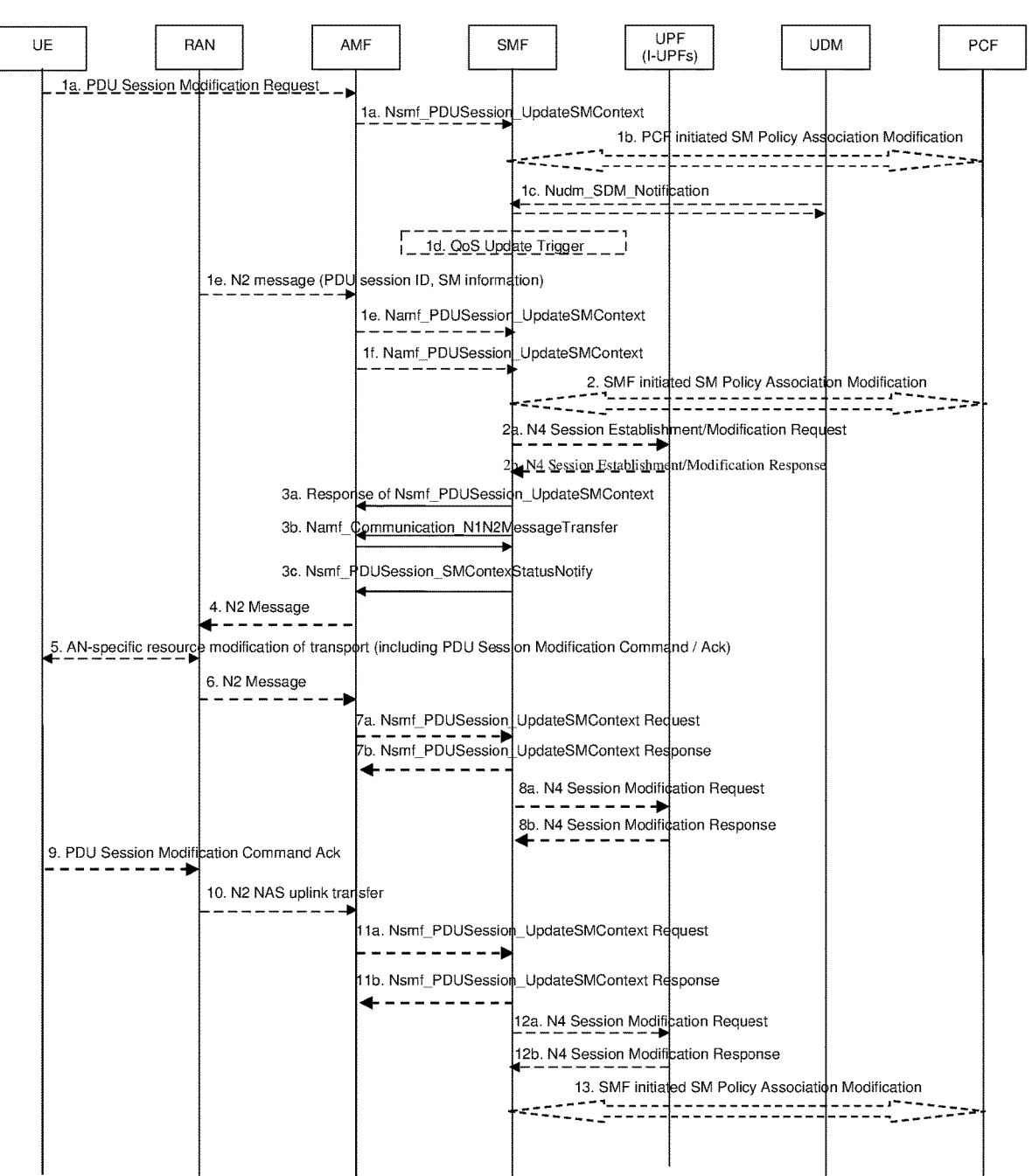
FIG. 16 is a reproduction of FIG. 4.3.3.2-1 of 3GPP TS 23.502 V16.5.1.

[Figure 4.3.3.2-1 of 3GPP TS 23.502 V16.5.1, Entitled "UE or Network Requested PDU Session Modification (for Non-Roaming and Roaming with Local Breakout)", is Reproduced as FIG. 16]

1. The procedure may be triggered by following events:

1a. (UE initiated modification) The UE initiates the PDU Session Modification procedure by the transmission of an NAS message (N1 SM container (PDU Session Modification Request (PDU session ID, Packet Filters, Operation, Requested QoS, Segregation, 5GSM Core Network Capability, Number Of Packet Filters, [Always-on PDU Session Requested])), PDU Session ID, UE Integrity Protection Maximum Data Rate, [Port Management Information Container]) message. Depending on the Access Type, if the UE was in CM-IDLE state, this SM-NAS message is preceded by the Service Request procedure. The NAS message is forwarded by the (R)AN to the AMF with an indication of User location Information. The AMF invokes Nsmf_P-DUSession_UpdateSMContext (SM Context ID, N1 SM container (PDU Session Modification Request)).

When the UE requests specific QoS handling for selected SDF(s), the PDU Session Modification Request includes Packet Filters describing the SDF(s), the requested Packet Filter Operation (add, modify, delete) on the indicated Packet Filters, the Requested QoS and optionally a Segregation indication. The Segregation indication is included when the UE recommends to the network to bind the applicable SDF(s) on a distinct and dedicated QoS Flow e.g. even if an existing QoS Flow can support the requested QoS. The network should abide by the UE request, but is allowed to proceed instead with binding the selected SDF(s) on an existing QoS Flow.

NOTE 1: Only one QoS Flow is used for traffic segregation. If UE makes subsequent requests for segregation of additional SDF(s), the additional SDF(s) are multiplexed on the existing QoS Flow that is used for segregation.

The UE shall not trigger a PDU Session Modification procedure for a PDU Session corresponding to a LADN when the UE is outside the area of availability of the LADN. The PS Data Off status, if changed, shall be included in the PCO in the PDU Session Modification Request message.

For a PDU Session which was established in the EPS, when the UE moves from EPS to 5GS for the first time, the UE includes an Always-on PDU Session Requested indication in the PDU Session Modification Request message if it wants to change the PDU Session to an always-on PDU Session.

When PCF is deployed, the SMF shall further report the PS Data Off status to PCF if the PS Data Off event trigger is provisioned, the additional behaviour of SMF and PCF for 3GPP PS Data Off is defined in TS 23.503 [20].

The 5GSM Core Network Capability is provided by the UE and handled by SMF as defined in TS 23.501 [2] clause 5.4.4b.

The UE Integrity Protection Maximum Data Rate indicates the maximum data rate up to which the UE can support UP integrity protection.

The Number Of Packet Filters indicates the number of supported packet filters for signalled QoS rules as described in TS 23.501 [2] clause 5.17.2.2.2.

Port Management Information Container is received from DS-TT and includes Ethernet-port related management information as defined in TS 23.501 [2] clause 5.28.3.

1b. (SMF requested modification) The PCF performs a PCF initiated SM Policy Association Modification procedure as defined in clause 4.16.5.2 to notify SMF about the modification of policies. This may e.g. have been triggered by a policy decision or upon AF requests, e.g. Application Function influence on traffic routing as described in step 5 in clause 4.3.6.2 or AF to provide Port management information Container. If the QoS Monitoring for URLLC is requested by the AF, the PCF generates the QoS Monitoring policy for the corresponding service data flow, and provides the policy in the PCC rules to the SMF in this step.

1c. (SMF requested modification) The UDM updates the subscription data of SMF by Nudm_SDM_Notification (SUPI, Session Management Subscription Data). The SMF updates the Session Management Subscription Data and acknowledges the UDM by returning an Ack with (SUPI).

1d. (SMF requested modification) The SMF may decide to modify PDU Session. This procedure also may be triggered based on locally configured policy or triggered from the (R)AN (see clause 4.2.6 and clause 4.9.1). It may also be triggered if the UP connection is activated (as described in Service Request procedure) and the SMF has marked that the status of one or more QoS Flows are deleted in the 5GC but not synchronized with the UE yet.

If the SMF receives one of the triggers in step 1b~1d, the SMF starts SMF requested PDU Session Modification procedure.

1e. (AN initiated modification) (R)AN shall indicate to the SMF when the AN resources onto which a QoS Flow is mapped are released irrespective of whether notification control is configured. (R)AN sends the N2 message (PDU Session ID, N2 SM information) to the AMF. The N2 SM information includes the QFI, User location Information and an indication that the QoS Flow is released. The AMF invokes Nsmf_PDUSession_UpdateSMContext (SM Context ID, N2 SM information). (AN initiated notification control) If notification control is configured for a GBR QoS Flow, (R)AN sends a N2 message (PDU Session ID, N2 SM information) to SMF when the (R)AN decides the QoS targets of the QoS Flow cannot be fulfilled or can be fulfilled again, respectively. The N2 SM information includes the QFI and an indication that the QoS targets for that QoS Flow cannot be fulfilled or can be fulfilled again, respectively. When QoS targets cannot be fulfilled, the N2 SM information indicates a reference to the Alternative QoS Profile matching the values of the QoS parameters that the NG-RAN is currently fulfilling as specified in clause 5.7.2.4 of TS 23.501 [2]. The AMF invokes Nsmf_PDUSession_UpdateSMContext (SM Context ID, N2 SM information). If the PCF has subscribed to the event, SMF reports this event to the PCF for each PCC Rule for which notification control is set in step 2.

1f. (AMF initiated modification) If the UE supports CE mode B and use of CE mode changes from restricted to unrestricted or vice versa in the Enhanced Coverage Restriction information in the UE context in the AMF and the UE has already established PDU sessions, then the AMF shall trigger a PDU session modification to the SMFs serving the UE's PDU sessions when the AMF determines that NAS-SM timer shall be updated due to the change of Enhanced Coverage Restriction and include the extended NAS-SM indication only if use of CE mode B is now unrestricted in the Enhanced Coverage Restriction information in the UE context in the AMF.

Based on the extended NAS-SM timer indication, the SMF shall use the extended NAS-SM timer setting for the UE as specified in TS 24.501 [25].

2. The SMF may need to report some subscribed event to the PCF by performing an SMF initiated SM Policy Association Modification procedure as defined in clause 4.16.5.1. This step may be skipped if PDU Session Modification procedure is triggered by step 1b or 1d. If dynamic PCC is not deployed, the SMF may apply local policy to decide whether to change the QoS profile.

Steps 2a to 7 are not invoked when the PDU Session Modification requires only action at a UPF (e.g. gating).

2a. If redundant transmission has not been activated to the PDU session and the SMF decides to perform redundant transmission for the QoS Flow, the SMF indicates to the UPF to perform packet duplication and elimination for the QoS Flow.

If redundant transmission has been activated on the PDU Session, and the SMF decides to stop redundant transmission, the SMF indicates the UPF to release the CN Tunnel Info which is used as the redundancy tunnel of the PDU Session, and also indicates the UPF to stop packet duplication and elimination for the corresponding QoS Flow(s).

NOTE 2: The method to perform elimination and reordering on RAN/UPF based on the packets received from the two GTP-U tunnels is up to RAN/UPF implementation.

The two GTP-U tunnels are terminated at the same RAN node and UPF.

If redundant transmission has not been activated to the PDU Session and the SMF decides to perform redundant transmission for the QoS Flow with two I-UPFs between the PSA UPF and the NG-RAN, the SMF sends a N4 Session Establishment Request message to the I-UPFs including UL CN Tunnel Info of the PSA UPF and a request to allocate CN Tunnel Info.

2b. The UPF(s) respond to the SMF. If redundant transmission has not been activated to the PDU session and the SMF indicated the UPF to perform packet duplication and elimination for the QoS Flow in step 2a, the UPF allocates an additional CN Tunnel Info. The additional CN Tunnel Info is provided to the SMF.

If redundant transmission has not been activated to the PDU Session and the SMF decides to perform redundant transmission for the QoS Flow with two I-UPFs in step 2a, the UPFs allocate CN Tunnel Info. The CN Tunnel Info of each I-UPF is provided to the SMF.

3a. For UE or AN initiated modification, the SMF responds to the AMF through Nsmf_PDUSession_UpdateSMContext Response ([N2 SM information (PDU Session ID, QFI(s), QoS Profile(s), [Alternative QoS Profile(s)], Session-AMBR], [CN Tunnel Info(s)]), N1 SM container (PDU Session Modification Command (PDU Session ID, QoS rule(s), QoS rule operation, QoS Flow level QoS parameters if needed for the QoS Flow(s) associated with the QoS rule(s), Session-AMBR, [Always-on PDU Session Granted], [Port Management Information Container]))). See TS 23.501 [2] clause 5.7 for the QoS Profile, Alternative QoS Profile, and QoS rule and QoS Flow level QoS parameters. Alternative QoS Profile is only valid for AN initiated modification.

If the PDU Session Modification was requested by the UE to modify a PDU Session to an always-on PDU Session, the SMF shall include an Always-on PDU Session Granted indication in the PDU Session Modification Command to indicate whether the PDU Session is to be changed to an always-on PDU Session or not via the Always-on PDU Session Granted indication in the PDU Session Modification Command.

The N2 SM information carries information that the AMF shall provide to the (R)AN. It may include the QoS profiles and the corresponding QFIs to notify the (R)AN that one or more QoS flows were added, or modified. It may include only QFI(s) to notify the (R)AN that one or more QoS flows were removed. The SMF may indicate for each QoS Flow whether redundant transmission shall be performed by a corresponding redundant transmission indicator. If the SMF decides to activate redundant transmission in step 2a, the SMF includes the allocated additional CN Tunnel Info in the N2 SM information. If the SMF decides to perform redundant transmission for new QoS Flow with two I-UPFs in step 2a, the SMF includes the allocated CN Tunnel Info of the two I-UPFs in the N2 SM information. If the PDU Session Modification was triggered by the (R)AN Release in step 1e the N2 SM information carries an acknowledgement of the (R)AN Release. If the PDU Session Modification was requested by the UE for a PDU Session that has no established User Plane resources, the N2 SM information provided to the (R)AN includes information for establishment of User Plane resources.

If redundant transmission has been activated on the PDU Session, and the SMF decides to stop redundant transmission in step 2a, the SMF indicates the (R)AN to release the AN Tunnel and stop packet duplication and elimination associated with the redundancy tunnel of the PDU Session.

The N1 SM container carries the PDU Session Modification Command that the AMF shall provide to the UE. It may include the QoS rules, QoS Flow level QoS parameters if needed for the QoS Flow(s) associated with the QoS rule(s) and corresponding QoS rule operation and QoS Flow level QoS parameters operation to notify the UE that one or more QoS rules were added, removed or modified.

If port number and a Port Management Information Container have been received from PCF in Step 2 and the port number matches the port number assigned for the DS-TT Ethernet port for this PDU session, then SMF includes the Port Management Information Container in the N1 SM container.

The SMF may need to send transparently through NG-RAN the PDU Session Modification Command to inform the UE about changes in the QoS parameters (i.e. 5QI, GFBR, MFBR) that the NG-RAN is currently fulfilling after the SMF receives QoS Notification Control as defined in TS 23.501 [2] clause 5.7.2.4. When the SMF sends on the PDU Session Modification Command transparently through NG-RAN, the N2 SM information is not included as part of the Namf_Communication_N1N2MessageTransfer.

3b. For SMF requested modification, the SMF invokes Namf_Communication_N1N2MessageTransfer ([N2 SM information] (PDU Session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR))).

The SMF may indicate for each QoS Flow whether redundant transmission shall be performed by a corresponding redundant transmission indicator. If the SMF decides to activate redundant transmission in step 2a, the SMF includes the allocated additional CN Tunnel Info in the N2 SM information. If the SMF decides to perform redundant transmission for new QoS Flow with two I-UPFs in step 2a, the SMF includes the allocated CN Tunnel Info of the two I-UPFs in the N2 SM information.

If redundant transmission has been activated on the PDU Session, and the SMF decides to stop redundant transmission in step 2a, the SMF indicates the (R)AN to release the AN Tunnel and stop packet duplication and elimination associated with the redundancy tunnel of the PDU Session.

The SMF indicates the request for QoS Monitoring for the QoS Flow according to the information received from the PCF in step 1b, or based on SMF local policy, e.g. when the RAN rejected the creation of a specific QoS Flow for URLLC. In the case of receiving the QoS Monitoring indication, the RAN enables the RAN part of UL/DL packet delay measurement for the QoS Flow and the QoS Monitoring reporting frequency is used by RAN to determine the packet delay measurement frequency of the RAN part. The TSCAI is defined in TS 23.501 [2] clause 5.27.2.

If the UE is in CM-IDLE state and an ATC is activated, the AMF updates and stores the UE context based on the Namf_Communication_N1N2MessageTransfer and steps 4, 5, 6 and 7 are skipped. When the UE is reachable e.g. when the UE enters CM-CONNECTED state, the AMF forwards the N1 message to synchronize the UE context with the UE.

3c. For SMF requested modification due to updated SMF-Associated parameters from the UDM, the SMF may provide the SMF derived CN assisted RAN parameters tuning to the AMF. The SMF invokes Nsmf_PDUSession-_SMContextStatusNotify (SMF derived CN assisted RAN parameters tuning) towards the AMF. The AMF stores the SMF derived CN assisted RAN parameters tuning in the associated PDU Session context for this UE.

4. The AMF may send N2 ([N2 SM information received from SMF], NAS message (PDU Session ID, N1 SM container (PDU Session Modification Command))) Message to the (R)AN.

5. The (R)AN may issue AN specific signalling exchange with the UE that is related with the information received from SMF. For example, in the case of a NG-RAN, an RRC Connection Reconfiguration may take place with the UE modifying the necessary (R)AN resources related to the PDU Session or if only N1 SM container is received in step 4 from AMF, RAN transports only the N1 SM container to the UE.

The (R)AN may consider the updated CN assisted RAN parameters tuning to reconfigure the AS parameters.

As part of this, the N1 SM container is provided to the UE. If the N1 SM container includes a Port Management Information Container then the UE provides the container to DS-TT.

6. The (R)AN may acknowledge N2 PDU Session Request by sending a N2 PDU Session Ack (N2 SM information (List of accepted/rejected QFI(s), AN Tunnel Info, PDU Session ID, Secondary RAT usage data), User location Information) Message to the AMF. In the case of Dual Connectivity, if one or more QFIs were added to the PDU Session, the Master RAN node may assign one or more of these QFIs to a NG-RAN node which was not involved in the PDU Session earlier. In this case the AN Tunnel Info includes a new N3 tunnel endpoint for QFIs assigned to the new NG-RAN node. Correspondingly, if one or more QFIs were removed from the PDU Session, a (R)AN node may no longer be involved in the PDU Session anymore, and the corresponding tunnel endpoint is removed from the AN Tunnel Info. The NG-RAN may reject QFI(s) if it cannot fulfil the User Plane Security Enforcement information for a corresponding QoS Profile, e.g. due to the UE Integrity Protection Maximum Data Rate being exceeded. When receiving the request for QoS Monitoring, the (R)AN may indicate its rejection to perform QoS Monitoring, e.g. due to the (R)AN load condition.

If the PLMN has configured secondary RAT usage reporting, the NG-RAN node may provide RAN Usage Data Report. The User Location Information shall include the serving cell's ID and, if Dual Connectivity is activated for the UE, the PSCell ID.

If the redundant transmission has not been activated to the PDU session, and the SMF indicates to the RAN that one of the QoS Flow shall perform redundant transmission, the RAN includes an additional AN tunnel info in N2 SM information.

7. The AMF forwards the N2 SM information and the User location Information received from the AN to the SMF via Nsmf_PDUSession_UpdateSMContext service operation. The SMF replies with a Nsmf_PDUSession_UpdateSMContext Response.

If the (R)AN rejects QFI(s) the SMF is responsible of updating the QoS rules and QoS Flow level QoS parameters if needed for the QoS Flow(s) associated with the QoS rule(s) in the UE accordingly.

If the PDU Session modification is UE triggered and the N2 SM information indicates modification failure, the SMF shall reject the PDU session modification by including a N1 SM container with a PDU Session Modification Reject message (see clause 8.3.3 of TS 24.501 [25]) in the Nsmf_PDUSession_UpdateSMContext Response in step 7*b*. Step 8 is skipped in this case.

8. The SMF may update N4 session of the UPF(s) that are involved by the PDU Session Modification by sending N4 Session Modification Request message to the UPF (see NOTE 3).

If new QoS Flow(s) are to be created, the SMF updates the UPF with UL Packet Detection Rules of the new QoS Flow.

NOTE 3: This allows the UL packets with the QFI of the new QoS Flow to be transferred. If an additional AN Tunnel Info is returned by RAN in step 6, the SMF informs the UPF about this AN Tunnel Info for redundant transmission. In the case of redundant transmission with two I-UPFs, the SMF provides AN Tunnel Info to two I-UPFs. If CN Tunnel Info of two I-UPFs is allocated by the UPFs in step 2*b*, the SMF also provides the DL CN Tunnel Info of two I-UPFs to the UPF (PSA).

If the QoS Monitoring for URLLC is enabled for the QoS Flow, the SMF provides the N4 rules containing the QoS Monitoring policy generated according to the information received in step 1*b* to the UPF via the N4 Session Modification Request message.

If port number and a Port Management Information Container have been received from PCF in Step 2 and the port number matches the port number of the NW-TT Ethernet port for this PDU session, then SMF includes the Port Management Information Container in the N4 Session Modification Request. If the N4 Session Modification Request includes a Port Management Information Container, then UPF also includes a Port Management Information Container in the N4 Session Modification Response.

9. The UE acknowledges the PDU Session Modification Command by sending a NAS message (PDU Session ID, N1 SM container (PDU Session Modification Command Ack, [Port Management Information Container])) message.

10. The (R)AN forwards the NAS message to the AMF.

11. The AMF forwards the N1 SM container (PDU Session Modification Command Ack) and User Location Information received from the AN to the SMF via Nsmf_PDUSession_UpdateSMContext service operation. The SMF replies with a Nsmf_PDUSession_UpdateSMContext Response.

If the SMF initiated modification is to delete QoS Flows (e.g. triggered by PCF) which do not include QoS Flow associated with the default QoS rule and the SMF does not receive response from the UE, the SMF marks that the status of those QoS Flows is to be synchronized with the UE.

12. The SMF may update N4 session of the UPF(s) that are involved by the PDU Session Modification by sending N4 Session Modification Request (N4 Session ID) message to the UPF. For a PDU Session of Ethernet PDU Session Type, the SMF may notify the UPF to add or remove Ethernet Packet Filter Set(s) and forwarding rule(s).

NOTE 4: The UPFs that are impacted in the PDU Session Modification procedure depends on the modified QoS parameters and on the deployment. For example in the case of the session AMBR of a PDU Session with an UL CL changes, only the UL CL is involved. This note also applies to the step 8.

13. If the SMF interacted with the PCF in step 1*b* or 2, the SMF notifies the PCF whether the PCC decision could be enforced or not by performing an SMF initiated SM Policy Association Modification procedure as defined in clause 4.16.5.1. If SMF received a Port Management Information Container from either UE or UPF, then SMF provides the Port Management Information Container and the port number of the related port to the PCF in this step, as described in clause 5.28.3.2 of TS 23.501 [2]

SMF notifies any entity that has subscribed to User Location Information related with PDU Session change.

If step 1*b* is triggered to perform Application Function influence on traffic routing by step 5 in clause 4.3.6.2, the SMF may reconfigure the User Plane of the PDU Session as described in step 6 in clause 4.3.6.2.

According to 3GPP TS 23.502, the UE may initiate Protocol Data Unit (PDU) Session Establishment procedure to establish a PDU session with the network (e.g. UPF) for user plane traffic transition. PDU Session Modification procedure is initiated when one or several of the Quality of Service (QoS) parameters of the PDU session exchanged between the UE and the network are modified. PDU Session Modification procedure could be initiated by the UE or the network.

When PDU Session Modification procedure is initiated by the network, Access and Mobility Management Function (AMF) sends a Non-Access Stratum (NAS) PDU including N1 SM container to the UE via the gNB. The N1 SM container carries the PDU Session Modification Command that the AMF shall provide to the UE. It may include the QoS rules, QoS Flow level QoS parameters if needed for the QoS Flow(s) associated with the QoS rule(s) and corresponding QoS rule operation and QoS Flow level QoS parameters operation to notify the UE that one or more QoS rules were added, removed or modified.

Regarding the NW initiated PDU Session Modification procedure, an example is shown in step 1*e* in FIG. 4.3.3.2-1 of 3GPP TS 23.502 V16.5.1, which is reproduced as FIG. 16. (R)AN (i.e. the gNB) could send a N2 message (PDU Session ID, N2 SM information) to SMF when the (R)AN decides the QoS targets of the QoS Flow cannot be fulfilled. The N2 SM information may include the QFI and an indication that the QoS targets for that QoS Flow cannot be fulfilled. When QoS targets cannot be fulfilled, the N2 SM information could indicate a reference to the Alternative QoS Profile matching the values of the QoS parameters that the NG-RAN is currently fulfilling. That is, it is possible that gNB could modify QoS targets (e.g. modifying or deleting a QFI) for the PDU session for a UE due to resource congestion when the gNB serves a lot of UEs. (R)AN (i.e. the gNB) could also send a N2 message (PDU Session ID, N2 SM information) to SMF when the (R)AN decides the QoS targets of the QoS Flow can be fulfilled again. Thus, it is possible that gNB could modify QoS targets (e.g. modifying or adding a QFI) for the PDU session for the UE when the gNB serves a few UEs.

According to 3GPP TR 23.752 V17.0.0, Layer-3 UE-to-Network Relay will be supported in NR for UEs in out-of-coverage to be served by relay UE which is in-coverage. There are two different UE-to-Network Relay PDU Session models. One is Dedicated Relay Session Model and the other is Shared Relay Session Model, as shown in FIG. 6.40.1-1 (not shown) of 3GPP TR 23.752 V17.0.0, which is entitled "UE-to-Network Relay PDU Session: Dedicated vs. Shared". The shared relay session model could be useful for the scenario where the relay UE provides the internet connection to the multiple Remote UE(s).

Since the UE-to-Network relay path comprises of two legs (PC5 and Uu), the end-to-end QoS can be met only when the QoS requirements are properly translated and satisfied over the two legs respectively. The QoS requirements on the PC5 link could be controlled with PC5 QoS rules and PC5 QoS parameters (PQI, GFBR, MFBR, PC5 LINK-AMBR, Range, etc). The QoS requirements on the Uu link could be controlled via with 5G QoS rules and 5G QoS parameters (5QI, GFBR, MFBR, etc). The Uu leg's QoS is associated with the PDU Session established by the relay UE. The Session Management Function (SMF) of the relay UE would provide the corresponding QoS rules and flow level QoS parameters to the relay UE. Thus, the relay UE needs to translate the Uu QoS information into the corresponding PC5 QoS parameters in order to achieve the proper end-to-end QoS. Since the Remote UE and the relay UE uses PC5 unicast communication mode, most of the flow level QoS parameters can be directly reused. The only parameter that requires assistance in the translation is the mapping of 5QIs/QFIs and PQIs. It is therefore necessary that the relay UE to be configured/provisioned with the proper mapping information. The mapping of 5QIs/QFIs and PQIs are configured/provisioned at the relay UE for a specific service or for a group of services. The 5QI/QFI for Uu and PQI for PC5 could be used together to support the end-to-end QoS requirement.

It is possible that the relay UE may receive a DL packet with RQI on the Uu interface for the remote UE from the network, based on the indicated QFI with the DL packet, the relay UE could then derive or update a QoS rule corresponding to the remote UE. The derived QoS rule is for UL packets from the remote UE at Uu interface. If the QFI to PC5 QoS flow (identified by a PFI corresponding to a PQI) mapping already exist, the relay UE may use the L2 Link Modification procedures to move the corresponding ProSe service(s) to the mapped existing PC5 QoS flow (based on indicated QFI). If the QFI to PC5 QoS flow mapping does not exist, the relay UE may determine the PQI based on the indicated 5QI/QFI (when the QFI is equivalent to a standardized 5QI), and sets up a new PC5 QoS Flow (which can be identified by a new PFI) with the derived PQI using L2 Link Modification procedures.

A relay UE may establish one PDU session with UPF in 5GC for relaying traffic of a remote UE. If the relay UE currently serves one remote UE and the PDU session for relaying is modified for a QoS flow, the relay UE can derive a PQI from the QFI of the QoS flow for creating a new PC5 QoS flow with the PQI. The relay UE can perform a L2 Link Modification procedure with the particular remote UE since the relay UE currently serves only this remote UE.

Figure 17:
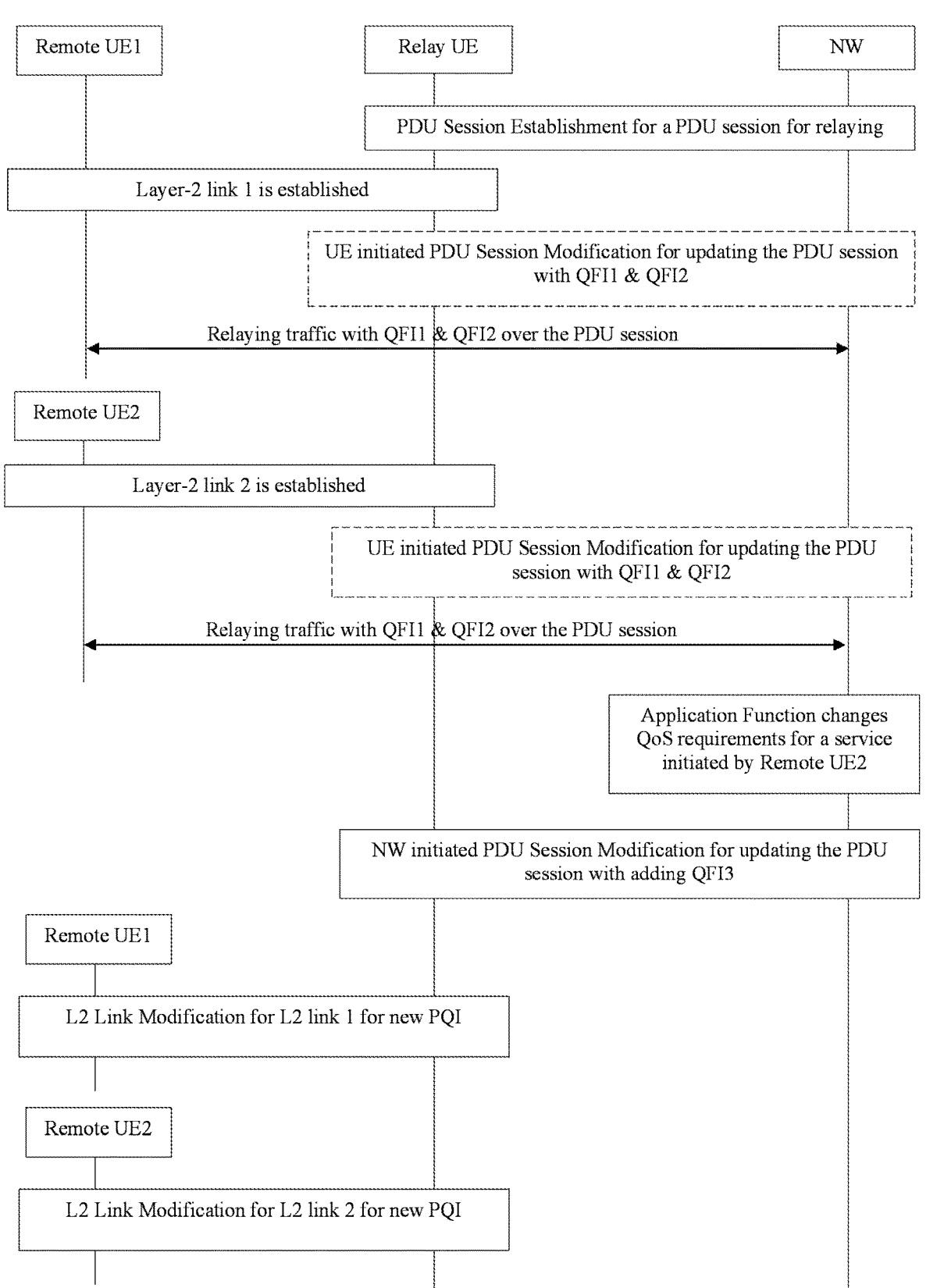
FIG. 17 is a diagram illustrating the issue according to one exemplary embodiment.

Basically, the relay UE could establish a PDU session for a service or a group of services. In case a relay UE serves more than one remote UEs for the service or the group of services, if one of these remote UEs initiates a service over internet connection that causes the application function in 5GC changes the QoS requirement, the 5GC may initiate NW initiated PDU Session Modification procedure with the relay UE for adding a QoS flow for satisfying the new QoS requirement. In response to the QoS rule/flow modification, the relay UE needs to perform individual L2 Link Modification Procedure with each remote UE in order for updating the new PC5 QoS flow since the relay UE does not know the new QoS rule/flow modification is initiated for which remote UE. The relay UE does not know the new QoS rule/flow modification is initiated for which remote UE since the PDU Session Modification Command message received from AMF does not include any information for identifying a particular remote UE if the PDU Session Modification procedure introduced in TS23.502 is reused for Layer-3 UE-to-Network Relay. In fact, this new PC5 QoS flow may not needed by other remote UEs. Thus, those L2 Link Modification procedures for those unrelated remote UEs are not necessary. This could be illustrated in FIG. 17.

Figure 18:
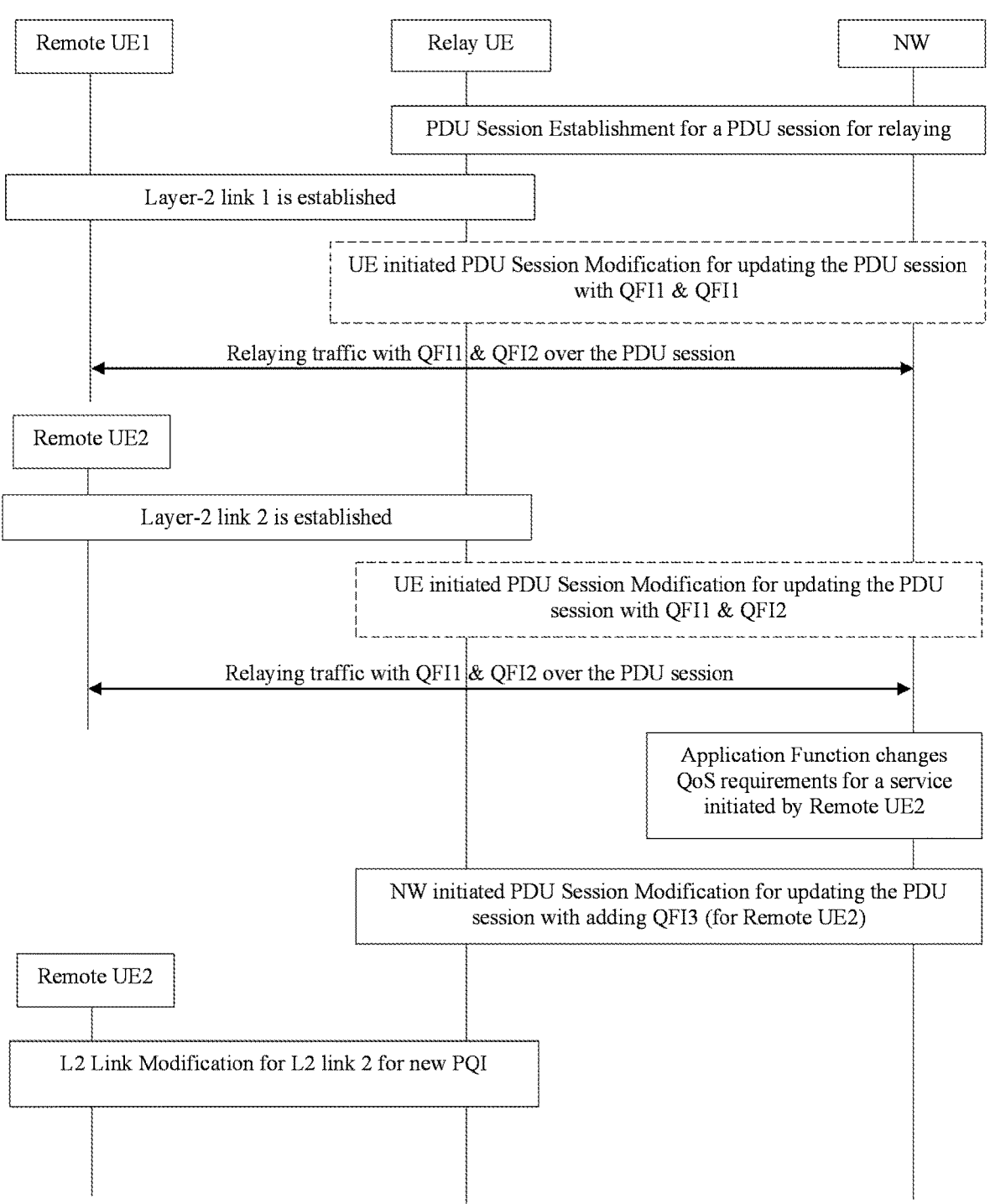
FIG. 18 is a diagram according to one exemplary embodiment.

In order for the relay UE to initiate L2 Link Modification procedure with a particular remote UE in response to the NW initiated PDU Session Modification, the PDU Session Modification Command message may need to include Remote UE ID (e.g. Layer-2 ID, IP address, SUCI, SUPI, GPSI, etc.) so that the relay UE can identify which remote UE will be needed to update with the new PC5 QoS flow with the PQI corresponding to the added/modified QFI. Since the remote UE needs to get authenticated and authorization in 5GC before the relay UE starts relay communication for the remote UE, the relay UE's AMF may acquire the remote UE's ID if the remote UE is verified to access the 5GC via the relay UE. Thus, the relay UE's AMF may provide the remote UE's ID to the relay UE after result of the authorization of the remote UE is successful. This could be illustrated in FIG. 18.

Figure 19:
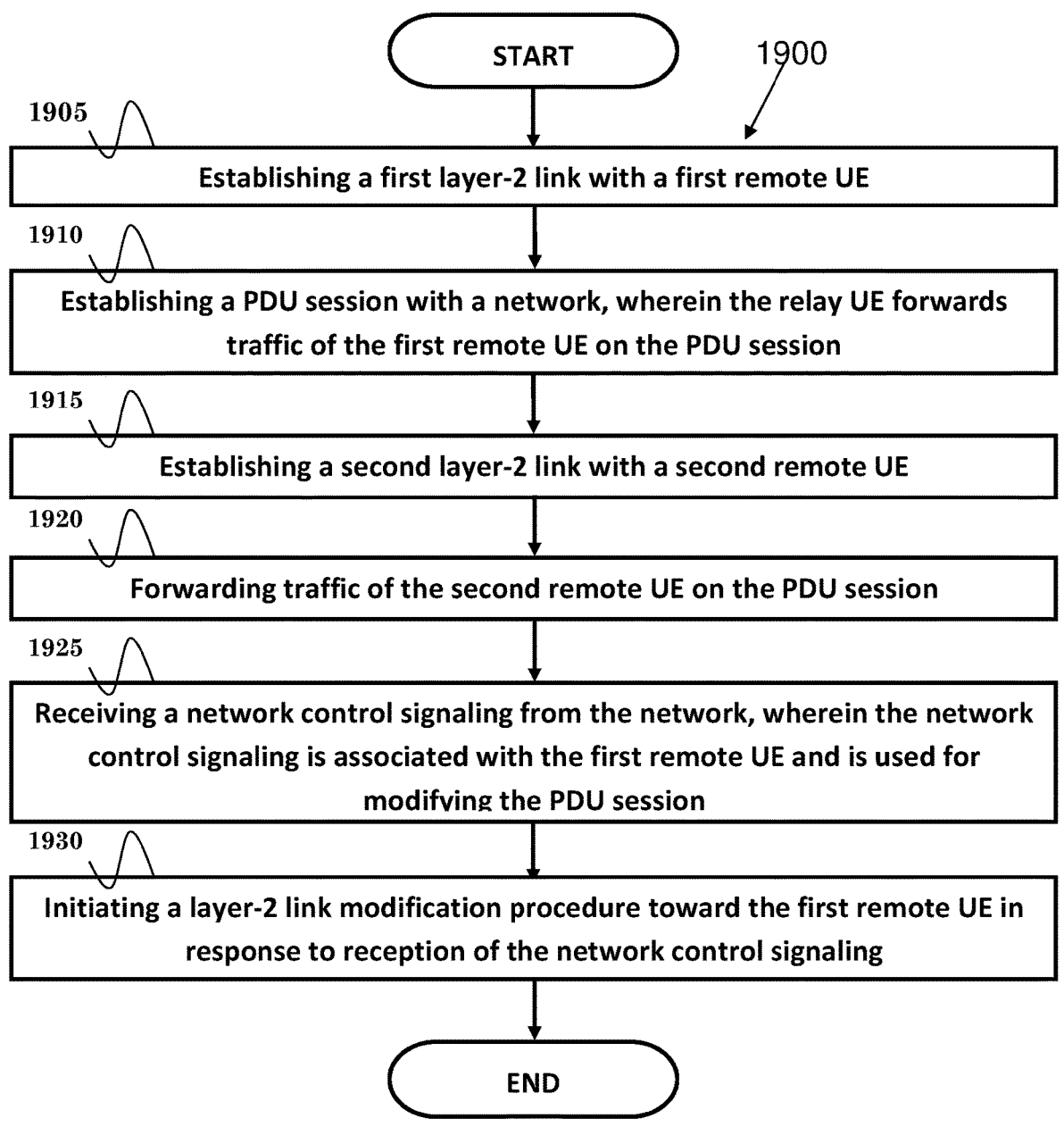
FIG. 19 is a flow chart according to one exemplary embodiment.

FIG. 19 is a flow chart 1900 illustrating a method for a relay UE. In step 1905, the relay UE establishes a first layer-2 link with a first remote UE. In step 1910, the relay UE establishes a PDU session with at network, wherein the relay UE forwards traffic of the first remote UE on the PDU session. In step 1915, the relay UE establishes a second layer-2 link with a second remote UE. In step 1920, the relay UE forwards traffic of the second remote UE on the PDU session. In step 1925, the relay UE receives a network control signaling from the network, wherein the network control signaling is associated with the first remote UE and is used for modifying the PDU session. In step 1930, the relay UE initiates a layer-2 link modification procedure toward the first remote UE in response to reception of the network control signaling.

In one embodiment, the relay UE may not initiate a layer-2 link modification procedure with the second remote UE in response to reception of the network control signaling. The network control signaling may include an identifier used to identify the first remote UE. The identifier could be used to identify the first remote UE is an IP address of the first remote UE. The network control signaling may include information used to add, modify or delete a QFI, a set of QoS parameters or a QoS flow used in the PDU session.

In one embodiment, the relay UE could transmit a first PC5-S message to the first remote UE in response to reception of the network control signaling, wherein the first PC5-S message is used for modifying the first layer-2 link. The relay UE could receive a second PC5-S message from the first remote UE, wherein the second PC5-S message is used for completing the modification on the first layer-2 link. The relay UE may not transmit any PC5-S message, which is used for modifying the second layer-2 link, to the second remote UE in response to reception of the network control signaling.

In one embodiment, the network may include a User Plane Function (UPF) and a Session Management Function (SMF). The network control signaling may be a PDU Session Modification Command message.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to establish a first layer-2 link with a first remote UE, (ii) to establish a PDU session with a first network node, wherein the relay UE forwards traffic of the first remote UE on the PDU session, (iii) to establish a second layer-2 link with a second remote UE, (iv) to forward traffic of the second remote UE on the PDU session, (v) to receive a NAS PDU from a second network node, wherein the NAS PDU is associated with the first remote UE and is used for modifying the PDU session, and (vi) to initiate a layer-2 link modification procedure with the first remote UE in response to reception of the NAS PDU. Furthermore, the CPU 308 can execute the program code 312 to perform all of the above-described actions and steps or others described herein.

Figure 20:
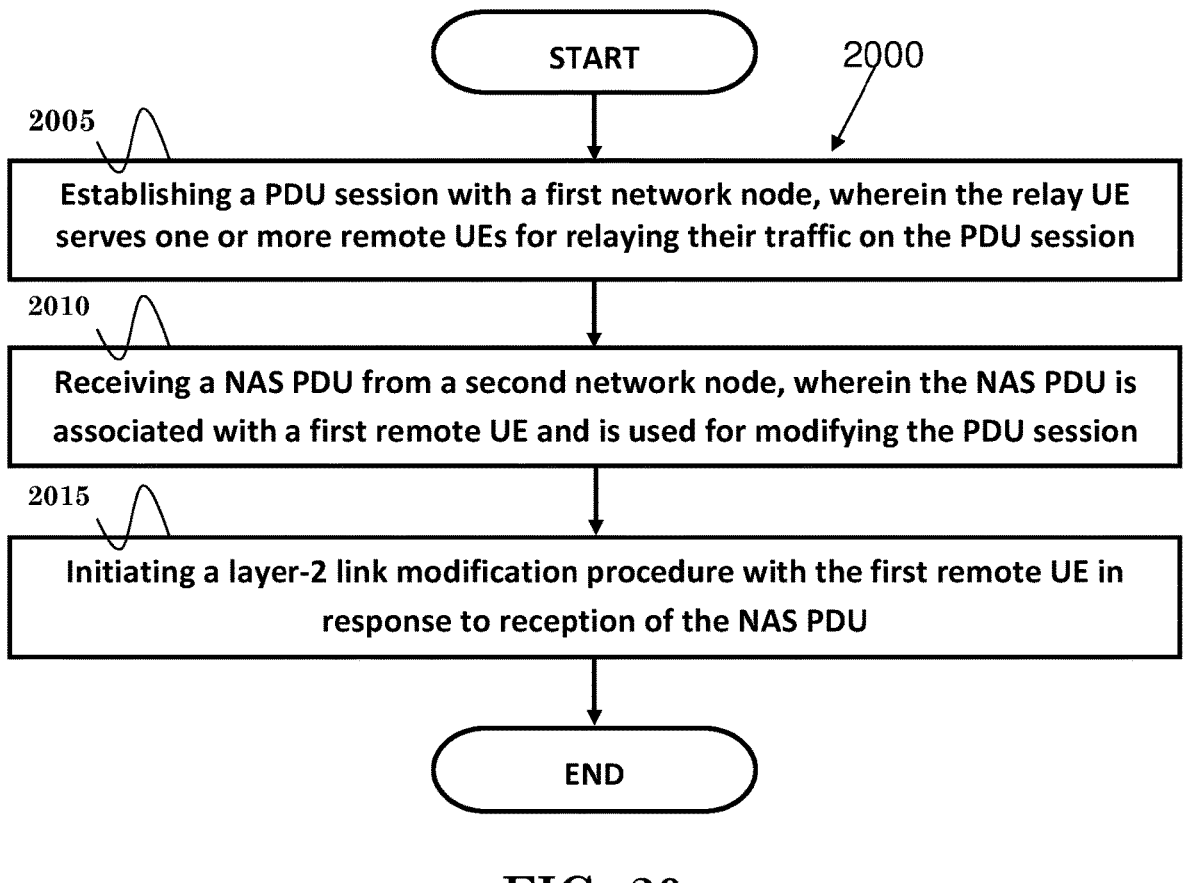
FIG. 20 is a flow chart according to one exemplary embodiment.

FIG. 20 is a flow chart 2000 illustrating a method for a relay UE. In step 2005, the relay UE establishes a PDU session with a first network node, wherein the relay UE serves one or more remote UEs for relaying their traffic on the PDU session. In step 2010, the relay UE receives a NAS PDU from a second network node, wherein the NAS PDU is associated with a first remote UE and is used for modifying the PDU session. In step 2015, the relay UE initiates a layer-2 link modification procedure with the first remote UE in response to reception of the NAS PDU.

In one embodiment, the relay UE could receive a first PC5-S message from the first remote UE, wherein the first PC5-S message is used for requesting a layer-2 link establishment of a first layer-2 link between the relay UE and the first remote UE. The relay UE could also transmit a second PC5-S message to the first remote UE, wherein the second PC5-S message is used for completing the layer-2 link establishment of the first layer-2 link. The relay UE could further receive a third PC5-S message from a second remote UE, wherein the third PC5-S message is used for requesting a layer-2 link establishment of a second layer-2 link between the relay UE and the second remote UE. In addition, the relay UE could transmit a fourth PC5-S message to the second remote UE, wherein the fourth PC5-S message is used for completing the layer-2 link establishment of the second layer-2 link. Furthermore, the relay UE could transmit a fifth PC5-S message to the first remote UE in response to reception of the NAS PDU, wherein the fifth PC5-S message is used for modifying the first layer-2 link. The relay UE could also receive a sixth PC5-S message from the first remote UE, wherein the sixth PC5-S message is used for completing the modification on the first layer-2 link.

In one embodiment, the relay UE may not transmit any PC5-S message, which is used for modifying the second layer-2 link, to the second remote UE in response to reception of the NAS PDU. The NAS PDU includes an identifier used to identify the first remote UE. The identifier could be used to identify the first remote UE is a Layer-2 ID, IP address, SUCI, SUPI or GPSI of the first remote UE.

In one embodiment, the NAS PDU may include information used to add, modify or delete a QFI, a set of QoS parameters or a QoS flow used in the PDU session. The first/third PC5-S message may be a Direct Communication Request message. The second/fourth PC5-S message may be a Direct Communication Accept message. The fifth PC5-S message may be a Link Modification Request message. The sixth PC5-S message may be a Link Modification Accept message.

In one embodiment, the first network node may be a UPF. The second network node may be a AMF or a SMF.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to establish a PDU session with a first network node, wherein the relay UE serves one or more remote UEs for relaying their traffic on the PDU session, (ii) to receive a NAS PDU from a second network node, wherein the NAS PDU is associated with a first remote UE and is used for modifying the PDU session, and (iii) to initiate a layer-2 link modification procedure with the first remote UE in response to reception of the NAS PDU. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:

establishing a first layer-2 link with a first remote UE;

establishing a Protocol Data Unit (PDU) session with a network, wherein the relay UE forwards traffic of the first remote UE on the PDU session;

establishing a second layer-2 link with a second remote UE;

forwarding traffic of the second remote UE on the PDU session;

receiving a network control signaling, comprising an Internet Protocol (IP) address associated with the first remote UE, from the network, wherein the network control signaling is used for modifying the PDU session; and initiating a layer-2 link modification procedure toward the first remote UE, in response to reception of the network control signaling, based on the IP address associated with the first remote UE and included in the network control signaling.

2. The method of claim 1, further comprising:

not initiating a layer-2 link modification procedure toward the second remote UE in response to reception of the network control signaling.

3. The method of claim 1, wherein the layer-2 link modification procedure is initiated toward the first remote UE but not the second remote UE in response to reception of the network control signaling based upon the network control signaling being associated with the first remote UE but not the second remote UE.

4. The method of claim 1, wherein the network control signaling includes information used to add, modify or delete a Quality of Service Flow Identity (QFI), a set of QoS parameters or a QoS flow used in the PDU session.

5. The method of claim 1, further comprising:

transmitting a first PC5-S message to the first remote UE in response to reception of the network control signaling, wherein the first PC5-S message is used for modifying the first layer-2 link.

6. The method of claim 5, further comprising:

receiving a second PC5-S message from the first remote UE, wherein the second PC5-S message is used for completing the modification on the first layer-2 link.

7. The method of claim 2, further comprising:

not transmitting any PC5-S message, which is used for modifying the second layer-2 link, to the second remote UE in response to reception of the network control signaling.

8. The method of claim 1, wherein the network includes a User Plane Function (UPF) and a Session Management Function (SMF).

9. The method of claim 1, wherein the network control signaling is a PDU Session Modification Command message.

10. A relay User Equipment (UE), comprising:

a control circuit;

a processor installed in the control circuit; and a memory installed in the control circuit and operatively coupled to the processor;

wherein the processor is configured to execute a program code stored in the memory to:

establish a first layer-2 link with a first remote UE;

establish a Protocol Data Unit (PDU) session with a network, wherein the relay UE forwards traffic of the first remote UE on the PDU session;

establish a second layer-2 link with a second remote UE;

forward traffic of the second remote UE on the PDU session;

receive a network control signaling, comprising an Internet Protocol (IP) address associated with the first remote UE, from the network, wherein the network control signaling is used for modifying the PDU session; and initiate a layer-2 link modification procedure toward the first remote UE, in response to reception of the network control signaling, based on the IP address associated with the first remote UE and included in the network control signaling.

11. The relay UE of claim 10, wherein the relay UE does not initiate a layer-2 link modification procedure toward the second remote UE in response to reception of the network control signaling.

12. The relay UE of claim 10, wherein the layer-2 link modification procedure is initiated toward the first remote UE but not the second remote UE in response to reception of the network control signaling based upon the network control signaling being associated with the first remote UE but not the second remote UE.

13. The relay UE of claim 10, wherein the network control signaling includes information used to add, modify or delete a Quality of Service Flow Identity (QFI), a set of QoS parameters or a QoS flow used in the PDU session.

14. The relay UE of claim 10, wherein the processor is further configured to execute a program code stored in the memory to:

transmit a first PC5-S message to the first remote UE in response to reception of the network control signaling, wherein the first PC5-S message is used for modifying the first layer-2 link.

15. The relay UE of claim 14, wherein the processor is further configured to execute a program code stored in the memory to:

receive a second PC5-S message from the first remote UE, wherein the second PC5-S message is used for completing the modification on the first layer-2 link.

16. The relay UE of claim 11, wherein the relay UE does not transmit any PC5-S message, which is used for modifying the second layer-2 link, to the second remote UE in response to reception of the network control signaling.

17. The relay UE of claim 10, wherein the network includes a User Plane Function (UPF) and a Session Management Function (SMF).

18. The relay UE of claim 10, wherein the network control signaling is a PDU Session Modification Command message.

19. A non-transitory computer-readable medium comprising instructions that when executed cause performance of operations comprising:

establishing a first layer-2 link with a first remote UE;

establishing a Protocol Data Unit (PDU) session with a network, wherein a relay User Equipment (UE) forwards traffic of the first remote UE on the PDU session;

establishing a second layer-2 link with a second remote UE;

forwarding traffic of the second remote UE on the PDU session;

receiving a network control signaling, comprising an Internet Protocol (IP) address associated with the first remote UE, from the network, wherein the network control signaling is used for modifying the PDU session; and initiating a layer-2 link modification procedure toward the first remote UE, in response to reception of the network control signaling, based on the IP address associated with the first remote UE and included in the network control signaling.

20. The non-transitory computer-readable medium of claim 19, the operations further comprising:

not initiating a layer-2 link modification procedure toward the second remote UE in response to reception of the network control signaling.

* * * * *